(12) United States Patent
Bijon et al.

(10) Patent No.: US 11,928,157 B2
(45) Date of Patent: Mar. 12, 2024

(54) PROJECTION CONSTRAINTS IN A QUERY PROCESSING SYSTEM

(71) Applicant: Snowflake Inc., Bozeman, MT (US)

(72) Inventors: Khalid Zaman Bijon, Santa Cruz, CA (US); Thierry Cruanes, San Mateo, CA (US); Simon Holm Jensen, Menlo Park, CA (US); Allison Waingold Lee, Pebble Beach, CA (US); Daniel N. Meredith, Laguna Beach, CA (US); Subramanian Muralidhar, Mercer Island, WA (US); David Schultz, Piedmont, CA (US); Zixi Zhang, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/934,814

(22) Filed: Sep. 23, 2022

(65) Prior Publication Data

US 2023/0401260 A1 Dec. 14, 2023

Related U.S. Application Data

(60) Provisional application No. 63/366,281, filed on Jun. 13, 2022.

(51) Int. Cl.
*G06F 16/903* (2019.01)
(52) U.S. Cl.
CPC .............................. *G06F 16/90335* (2019.01)
(58) Field of Classification Search
None
See application file for complete search history.

(56) References Cited

U.S. PATENT DOCUMENTS 8,813,174 B1 * 8/2014 Koeten ................... H04L 67/10
713/168
11,468,049 B2 * 10/2022 Griffith ............... G06F 16/2423
(Continued)

FOREIGN PATENT DOCUMENTS

EP 3594822 A1 * 1/2020 ............ G06F 16/211

OTHER PUBLICATIONS

Liu, M., Fu, G., & Jing, J. (Nov. 2011). eHCBAC: Flexible Column Based Access Control for Electronic Healthcare Systems. In 2011IEEE 10th International Conference on Trust, Security and Privacy in Computing and Communications (pp. 745-750). IEEE. (Year: 2011).*
(Continued)

*Primary Examiner* — Uyen T Le
(74) *Attorney, Agent, or Firm* — Schwegman Lundberg & Woessner, P.A.

(57) ABSTRACT

A constraint system enforces projection constraints on data values stored in specified columns of a shared dataset when queries are received by a database system. A projection constraint identifies that the data in a column may be restricted from being projected (e.g., presented, read, outputted) in an output to a received query, while allowing specified operations to be performed on the data and a corresponding output to be provided. For example, the projection constraint may indicate a context for a query that triggers the constraint, such as based on the user that submitted the query. Enforcing projection constraints on queries received at the database system allows for data to be shared and used anonymously by entities to perform various operations without the need to tokenize the data.

30 Claims, 17 Drawing Sheets

(56) References Cited

U.S. PATENT DOCUMENTS

| | | | |
|---|---|---|---|
| 11,567,943 B1 | 1/2023 | Blum et al. | |
| 2009/0319535 A1 | 12/2009 | Webber et al. | |
| 2011/0314513 A1* | 12/2011 | Carter | G06F 21/604 |
| | | | 726/4 |
| 2013/0054570 A1 | 2/2013 | Gonzales et al. | |
| 2013/0191185 A1* | 7/2013 | Galvin | G06Q 10/10 |
| | | | 705/7.36 |
| 2016/0070758 A1 | 3/2016 | Thomson et al. | |
| 2018/0218044 A1* | 8/2018 | Wong | G06F 16/2282 |
| 2018/0373757 A1* | 12/2018 | Schukovets | G06F 16/221 |
| 2019/0213185 A1 | 7/2019 | Arroyo et al. | |
| 2020/0311294 A1* | 10/2020 | Sim-Tang | G06F 16/1774 |
| 2020/0379994 A1 | 12/2020 | Rajaperumal et al. | |
| 2021/0133196 A1 | 5/2021 | Gladwin et al. | |
| 2021/0209077 A1* | 7/2021 | Snellman | G06F 16/219 |
| 2021/0216537 A1 | 7/2021 | Mccray et al. | |
| 2022/0277097 A1* | 9/2022 | Cabot | H04W 12/02 |
| 2022/0311749 A1* | 9/2022 | Natarajan | G06N 3/088 |
| 2023/0281342 A1 | 9/2023 | Taber et al. | |

OTHER PUBLICATIONS

Kanwal, Tehsin, et al. "Privacy preservation of electronic health records with adversarial attacks identification in hybrid cloud." Computer Standards & Interfaces 78 (2021): 103522. (Year: 2021).*

Ortiz, J., De Almeida, V. T., & Balazinska, M. (Jun. 2013). A vision for personalized service level agreements in the cloud. In Proceedings of the Second Workshop on Data Analytics in the Cloud (pp. 21-25), (Year: 2013).*

Tang, Bo, Ravi Sandhu, and Qi Li. "Multi-tenancy authorization models for collaborative cloud services." Concurrency and Computation: Practice and Experience 27.11 (2015): 2851-2868. (Year: 2015).*

Sanghi, Anupam, Shadab Ahmed, and Jayant R. Haritsa. "Data Generation using Projection Constraints." (2021). 38 pages. (Year: 2021).*

"U.S. Appl. No. 18/104,271, Preliminary Amendment filed Feb. 2, 2023", 12 pgs.

"U.S. Appl. No. 18/104,271, Non Final Office Action dated Apr. 17, 2023", 29 pgs.

"U.S. Appl. No. 18/104,271, Examiner Interview Summary dated Jul. 19, 2023", 2 pgs.

"U.S. Appl. No. 18/104,271, Final Office Action dated Aug. 3, 2023", 28 pgs.

"U.S. Appl. No. 18/104,271, Response filed Jul. 17, 2023 to Non Final Office Action dated Apr. 17, 2023", 17 pgs.

"U.S. Appl. No. 18/104,271, Response filed Nov. 3, 2023 to Final Office Action dated Aug. 3, 2023", 19 pgs.

"U.S. Appl. No. 18/345,971, Non Final Office Action dated Sep. 20, 2023", 22 pgs.

"International Application Serial No. PCT/US2023/025026, International Search Report dated Jul. 26, 2023", 2 pgs.

"International Application Serial No. PCT/US2023/025026, Written Opinion dated Jul. 26, 2023", 4 pgs.

\* cited by examiner

PARTY_1 SOURCE DATA 500

| CUST_ID | EMAIL |
|---|---|
| 1 | XYZ@123.NET |
| 2 | ABC@123.NET |

PARTY_2 SOURCE DTA 550

| CUST_ID | EMAIL |
|---|---|
| 100 | GEF@456.NET |
| 200 | ABC@123.NET |

*FIG. 5*

PROJECTION CONSTRAINTS IN A QUERY PROCESSING SYSTEM

CROSS REFERENCE TO RELATED APPLICATIONS

The present application claims the benefit of priority of U.S. Provisional Application No. 63/366,281, filed on Jun. 13, 2022, which is incorporated herein by reference in its entirety.

TECHNICAL FIELD

The present disclosure generally relates to efficiently managing access to shared data in a database.

BACKGROUND

Databases are used for data storage and access in computing applications. A goal of database storage is to provide enormous sums of information in an organized manner so that it can be accessed, managed, and updated. In a database, data may be organized into rows, columns, and tables. A database platform can have different databases managed by different users. The users may seek to share their database data with one another; however, it is difficult to share the database data in a secure and scalable manner.

BRIEF DESCRIPTION OF THE DRAWINGS

Various ones of the appended drawings merely illustrate example embodiments of the present disclosure and should not be considered as limiting its scope.

FIG. 5 shows example table data, according to some example embodiments.

DETAILED DESCRIPTION

Figure 1:
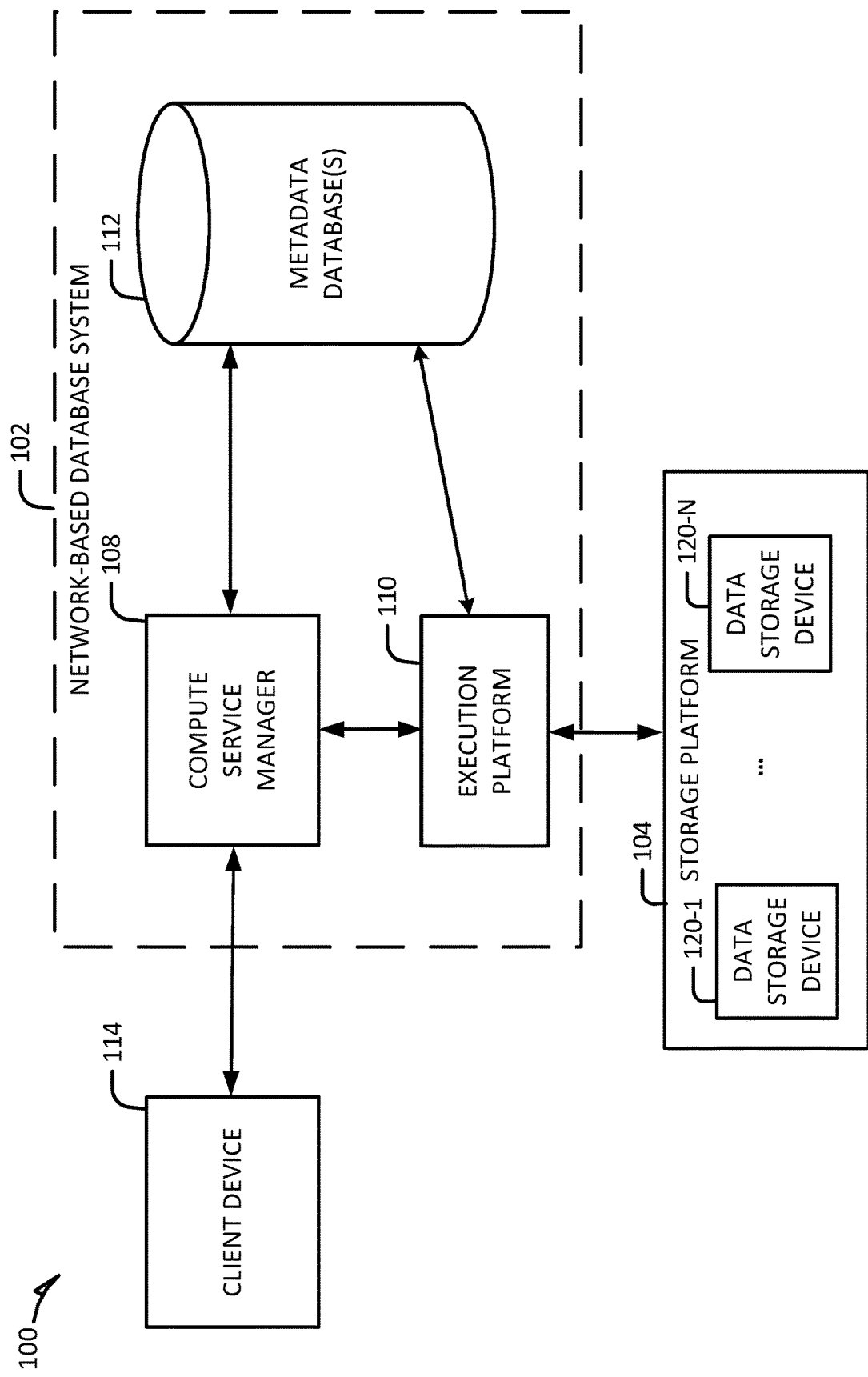
FIG. 1 illustrates an example computing environment in which a network-based database system can implement projection constraints, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Databases are used by various entities (e.g., businesses, people, organizations, etc.) to store data. For example, a retailer may store data describing purchases (e.g., product, date, price) and the purchasers (e.g., name, address, email address). Similarly, an advertiser may store data describing performance of their advertising campaigns, such as the advertisements served to users, date that advertisement was served, information about the user, (e.g., name, address, email address), and the like.

In some cases, entities may wish to share their data with each other. For example, a retailer and advertiser may wish to share their data to determine the effectiveness of an advertisement campaign, such as by determining whether users that were served advertisements for a product ultimately purchased the product. In these types of situations, the entities may wish to maintain the confidentiality of some or all of the data they have collected and stored in their respective databases. For example, a retailer and/or advertiser may wish to maintain the confidentiality of personal identifying information (PII), such as usernames, addresses, email addresses, credit card numbers, and the like.

Current solutions address this problem through use of tokenization in which the data values stored in the respective databases are anonymized into tokens in a consistent and deterministic manner prior to being shared. For example, a hashing algorithm can be used by each entity to generate hash values (e.g., tokens) representing the individual data values stored in the databases. The entities share these tokens with each other, which can then be used to compare data and find matching values, while maintaining the confidentiality of the underlying data.

Tokenization, however, has several drawbacks. One drawback is that tokenization does not allow for fuzzy or proximate matches. In some cases, data may not be entered in a consistent format or correctly in various databases. As tokenization utilizes a deterministic algorithm to generate the tokens, only exact matches can be identified and these variations in format and data entries (e.g., fuzzy matches) cannot be accounted for. Another drawback with tokenization is the complexity and computational resources required to generate the tokens. For example, a hashing algorithm is used to generate hash values for a large number of data values stored in the respective databases. Another drawback with tokenization is limited functionality as the tokens can only be used to find exact matches between two datasets. Other functionality, such as determining a number of data entries that do not match, but include a specified string or set of characters cannot be performed.

To alleviate these issues, a database system may utilize a constraint system that enforces projection constraints on data values stored in specified columns of a shared dataset when queries are received by the database system. A projection constraint identifies that the data in a column may be restricted from being projected (e.g., presented, read, outputted) in an output to a received query, while allowing specified operations to be performed on the data and a corresponding output to be provided. For example, the projection constraint may indicate a context for a query that triggers the constraint, such as based on the user that submitted the query.

An entity sharing data may define the projection constraints to be attached to various columns of a shared dataset. For example, the entity may define the column or columns that the projection constraint should be attached to, as well as the conditions for triggering the constraint. When a query directed towards the shared dataset is received by the database system, the constraint system accesses the data needed to process the query from the shared database and determines whether a projection constraint is attached to any of the columns of the shared dataset from which the data was accessed. If a projection constraint is attached to one of the columns, the constraint system determines whether the projection constraint should be enforced based on the context of the query and generates an output accordingly. For example, if the projection constraint should be enforced, the constraint system may generate an output that does not include the data values stored in the columns but may provide an output determined based on the constrained data, such as a number of matches, number of fuzzy matches, number of matches including a specified string, unconstrained data associated with the constrained data, and the like.

Enforcing projection constraints on queries received at the database system allows for data to be shared and used anonymously by entities to perform various operations without the need to tokenize the data. As a result, the difficulty and computing resources required for tokenization is eliminated, and additional functionality and operations (e.g., fuzzy matching) can be performed while maintaining the confidentiality of specified data values.

FIG. 1 illustrates an example computing environment 100 in which a network-based database system 102 can implement projection constraints, according to some example embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts, such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, metadata database(s) 112 may include a summary of data stored in remote data storage systems as well as data available from a local cache. Additionally, metadata database(s) 112 may include information regarding how data is partitioned and organized in remote data storage systems (e.g., the cloud storage platform 104) and local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, avoiding those non-pertinent micro-partitions when responding to the query, and scanning only the pertinent micro-partitions to respond to the query. Metadata may be automatically gathered on all rows stored in a micro-partition, including the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata database 112

(e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and cloud storage platform 104 are shown in FIG. 1 as individual discrete components. However, each of the compute service managers 108, metadata databases 112, execution platforms 110, and cloud storage platforms 104 may be implemented as a distributed system (e.g., distributed across multiple systems/platforms at multiple geographic locations). Additionally, each of the compute service managers 108, metadata databases 112, execution platforms 110, and cloud storage platforms 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
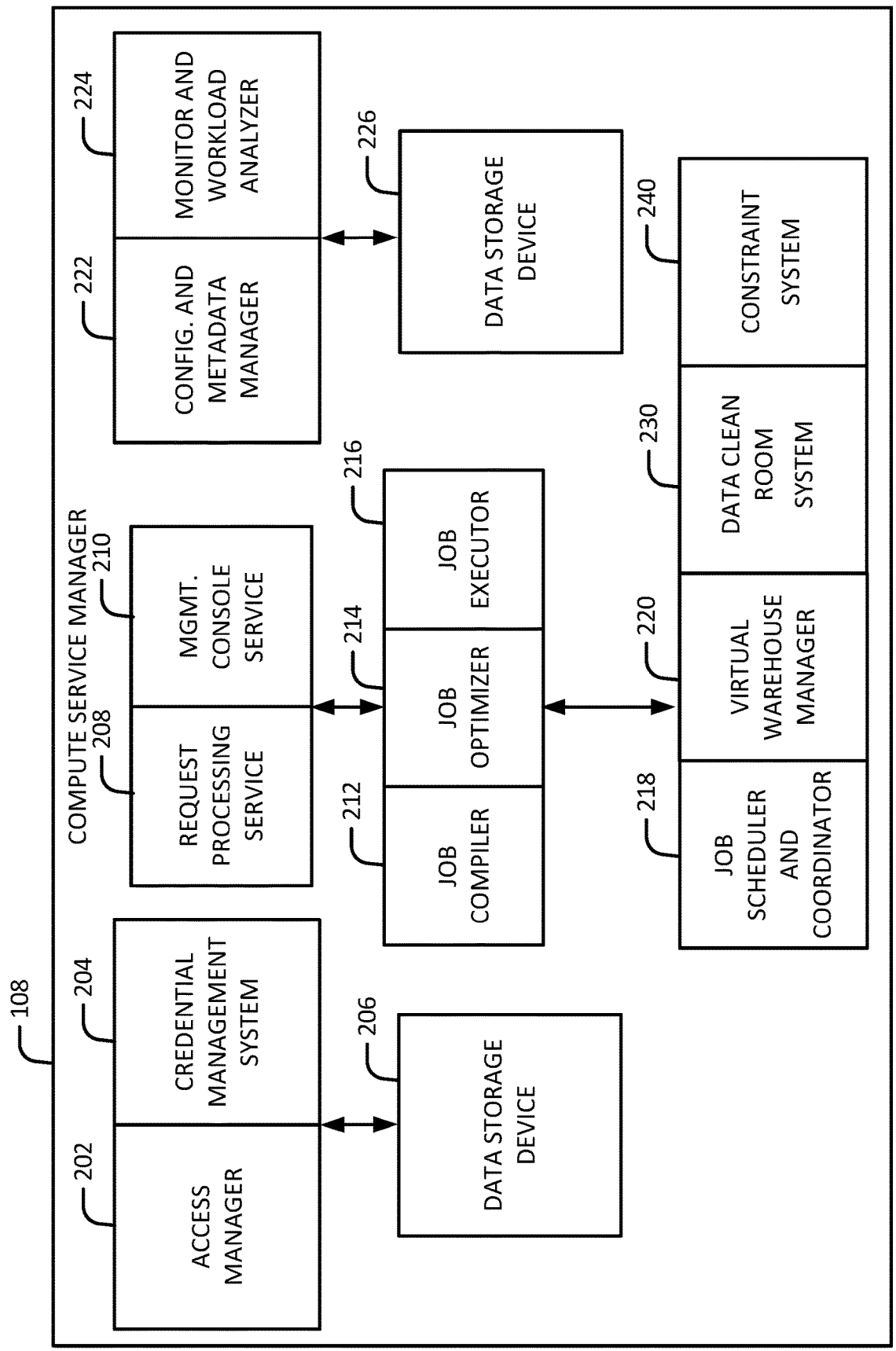
FIG. 2 is a block diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to data storage device 206, which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., access metadata database, a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110 of FIG. 1. For example, jobs may be prioritized and then processed in the prioritized order. In an embodiment, the job scheduler and coordinator 218 determines a priority for internal jobs that are scheduled by the compute service manager 108 of FIG. 1 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The data clean room system 230 allows for dynamically restricted data access to shared datasets, as discussed in further detail below. The constraint system 240 provides for projection constraints on data values stored in specified columns of shared datasets, as discussed in further detail below.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 of FIG. 3) may need to communicate with another execution node (e.g., execution node 302-2 of FIG. 3), but should be disallowed from communicating with a third execution node (e.g., execution node 312-1), and any such illicit communication can be recorded (e.g., in a log or other location). Also, the information stored on a given execution node is restricted to data relevant to the current query, and any other data is unusable, rendered so by destruction or encryption where the key is unavailable.

Figure 3:
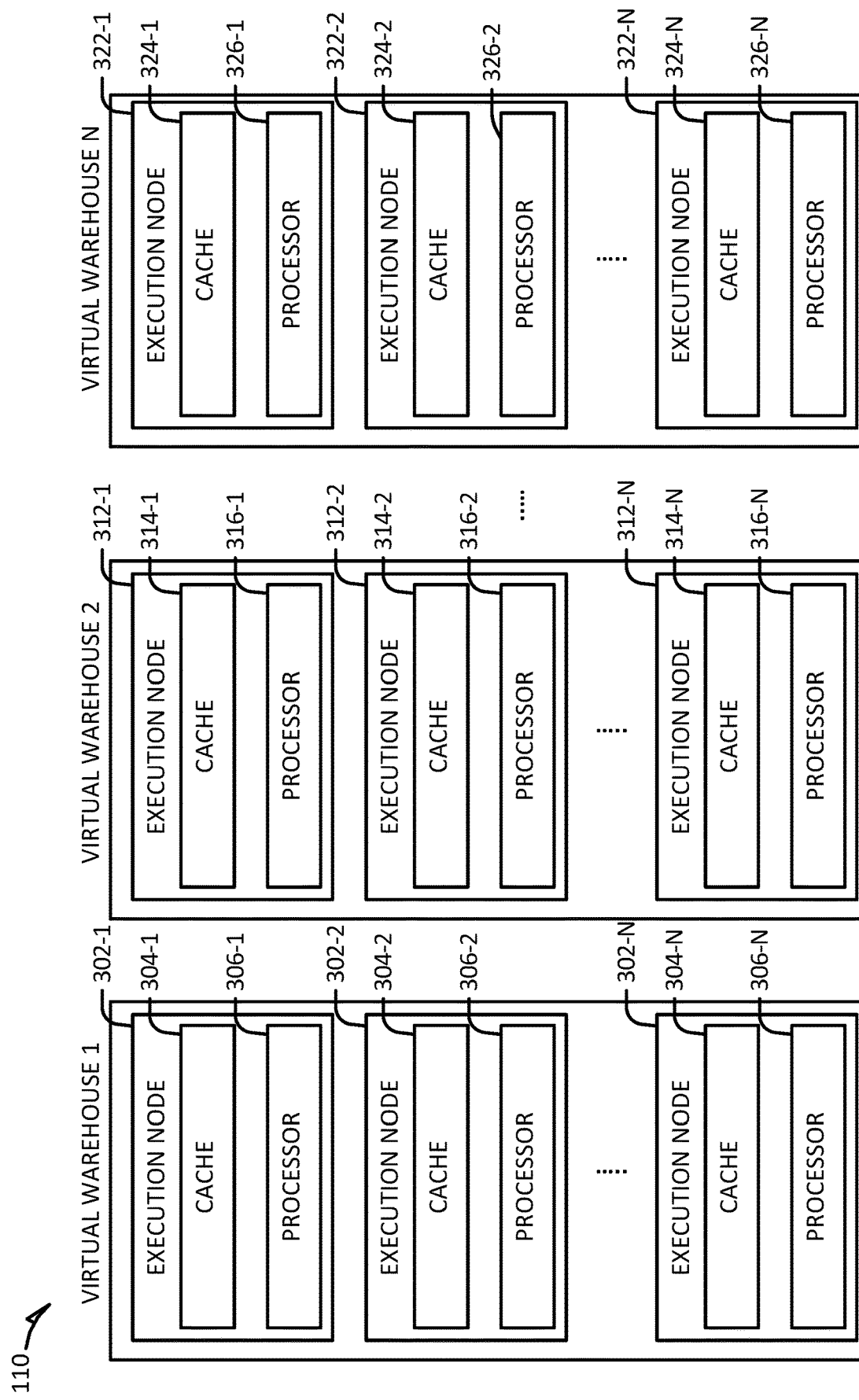
FIG. 3 is a block diagram illustrating components of an execution platform, according to some example embodiments.

FIG. 3 is a block diagram illustrating components of the execution platform 110 of FIG. 1, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104 of FIG. 1. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet, another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
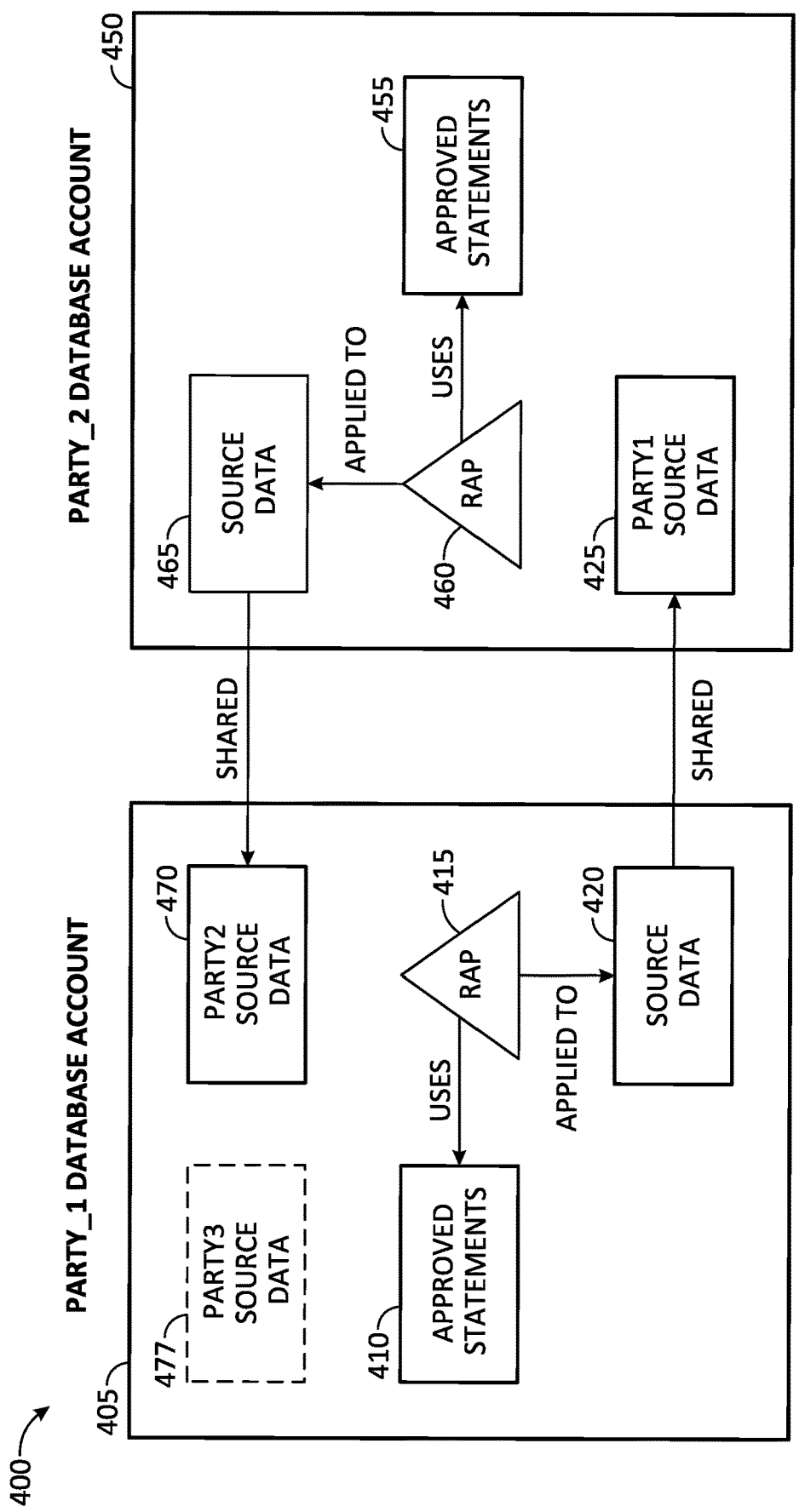
FIG. 4 shows an example of database restrictions on access to database data, according to some example embodiments.

FIG. 4 shows a dynamically restricted data clean room system 230, according to some example embodiments. In FIG. 4, a first database account 405 and a second database account 450 share data in a data clean room system 230 against which queries can be issued by either account. In the following example, the first database account 405 provides data to the second database account 450 (e.g., using approved statements table 410, row access policy engine (RAP) 415, source data 420, and shared source data 425), and it is appreciated that the second database account 450 can similarly share data with the first database account 405 (e.g., using approved statements table 455, row access policy engine (RAP) 460, source data 465, and shared source data 470).

In the example of FIG. 4, the data clean room system 230 implements a row access policy scheme (e.g., row access policy engine 415, row access policy engine 460) on the shared datasets of the first and second database accounts (e.g., source data 420, source data 465). In some example embodiments, the row access policy engine 460 is implemented as a database object of the network-based database system 102 that restricts source data of a database account for use and/or sharing in the clean room. In some example embodiments, a database object in the network-based database system 102 is a data structure used to store and/or reference data. In some example embodiments, the network-based database system 102 implements one or more of the following objects: a database table, a view, an index, a stored procedure of the database system, a user-defined function of the database system, or a sequence. In some example embodiments, when the network-based database system 102 creates a database object type, the object is locked, and a new object type cannot be created due to the network-based database system 102 restricting the object types using the source code of the database system. In some example embodiments, when objects are created, a database object instance is what is created by the database system 102 as an instance of a database object type (e.g., such as a new table, an index on that table, a view on the same table, or a new stored procedure object). The row access policy engine 460 provides row-level security to data of the network-based database system 102 through the use of row access policies to determine which rows to return in the query result. Examples of a row access policy include: allowing one particular role to view rows of a table (e.g., user role of an end-user issuing the query), or including a mapping table in the policy definition to determine access to rows in a given query result. In some example embodiments, a row access policy is a schema-level object of the network-based database system 102 that determines whether a given row in a table or view can be viewed from different types of database statements including SELECT statements or rows selected by UPDATE, DELETE, and MERGE statements.

In some example embodiments, the row access policies include conditions and functions to transform data at query runtime when those conditions are met. The policy data is implemented to limit sensitive data exposure. The policy data can further limit an object's owner (e.g., the role with the OWNERSHIP privilege on the object, such as a table or view) who normally has full access to the underlying data. In some example embodiments, a single row access policy engine is set on different tables and views to be implemented at the same time. In some example embodiments, a row access policy can be added to a table or view either when the object is created or after the object is created.

In some example embodiments, a row access policy comprises an expression that can specify database objects (e.g., table or view) and use Conditional Expression Functions and Context Functions to determine which rows should be visible in a given context. The following is an example of a row access policy being implemented at query runtime: (A) for data specified in a query, the network-based database system 102 determines whether a row access policy is set on a database object. If a policy is added to the database object, all rows are protected by the policy. (B) The distributed database system then creates a dynamic secure view (e.g., a secure database view) of the database object. (C) The policy expression is evaluated. For example, the policy expression can specify a "current statement" expression that only proceeds if the "current statement" is in the approved statements table or if the current role of the user that issued the query is a previously specified and allowed role. (D) Based on the evaluation of the policy, the restriction engine generates the query output, such as source data to be shared from a first database account to a second database account, where the query output only contains rows based on the policy definition evaluating to TRUE.

Continuing with reference to FIG. 4, the contents of the approved statements table is agreed upon or otherwise generated by the first database account 405 and second database account 450. For example, the users managing the first database account 405 and second database account 450 agree upon query language that is acceptable to both and include the query language in the approved statements table, and the agreed upon language is stored in the approved statements table 410 on the first database account 405 and also stored in the approved statements table 455 in the second database account 450. As an illustrative example, the source data 420 of the first database account 405 can include a first email dataset 500 of the first database account's users, and the source data 465 of the second database account 450 can include a second email dataset 550 of the second database accounts users, as illustrated in FIG. 5. The two database accounts may seek to determine how many of their user email addresses in their respective datasets match, where the returned result is a number (e.g., each has end users and the two database accounts are interested in how many users they share, but do not want to share the actual users' data). To this end, the two database accounts store "SELECT COUNT" in the approved query requests table. In this way, a counting query that selects and joins the source data can proceed, but a "SELECT *" query that requests and potentially returns all user data cannot proceed because it is not in the approved statements tables of the respective dataset accounts (e.g., the approved statements table 410 and the approved statements table 455).

Further, although only two database accounts are illustrated in FIG. 4, the data clean room system 230 enables two or more database accounts to share data through the clean room architecture. In past approaches, data clean room data is obfuscated (e.g., tokenized) and then shared in a data clean room, and the complexity of matching obfuscated data can result in limiting the data clean room data to only two parties at a time. In contrast, in the approach of FIG. 4, a third database account (not illustrated in FIG. 4) can provide a third-party shared dataset 477 using the data clean room system 230 in the compute service manager 108, and database statements can be issued that join data from the three datasets, such as a SELECT COUNT on a joined data from the source data 420, the shared source data 470 from the second database account 450, and the third-party shared dataset 477 from the third database account (e.g., as opposed to a requester database account sharing data with a first provider database account, and the requester database account further correlating the data with another second provider database account using sequences of encrypted functions provided by the first and second provider accounts), in accordance with some example embodiments.

Figure 6A:
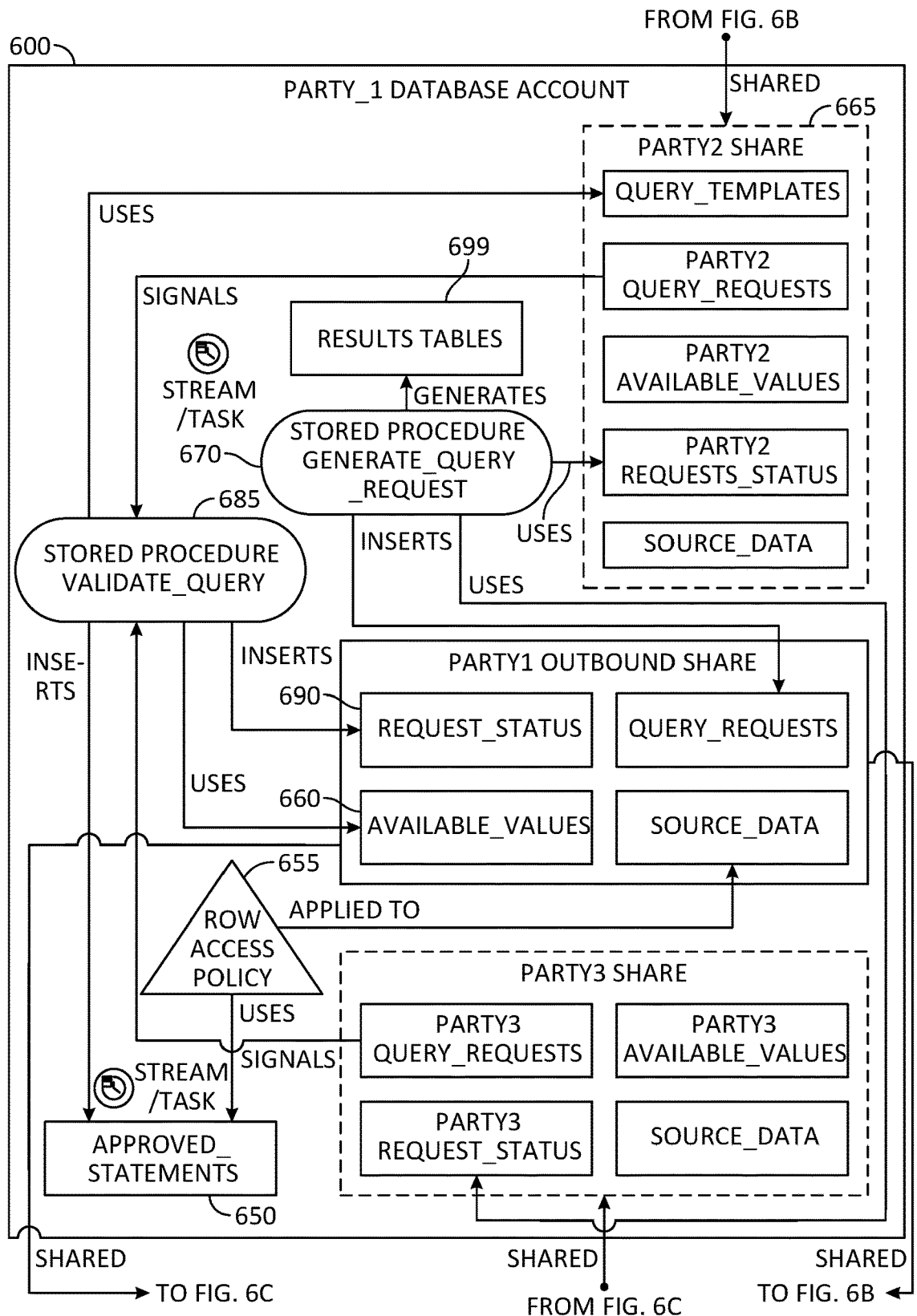
FIGS. 6A-C show example database architectures for implementing query templates for multiple entities sharing data in a data clean environment, according to some example embodiments.
Figure 6B:
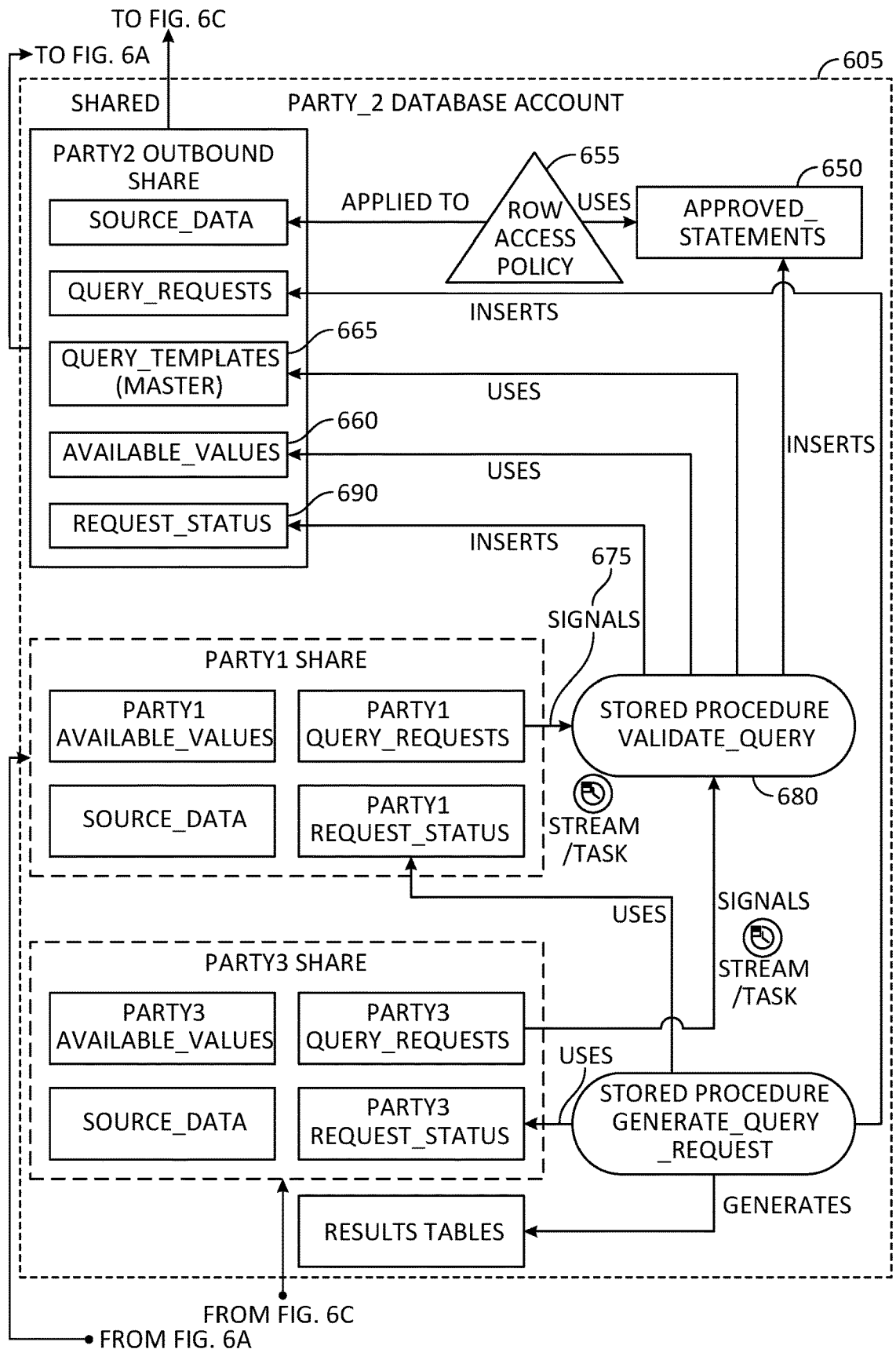
Figure 6C:
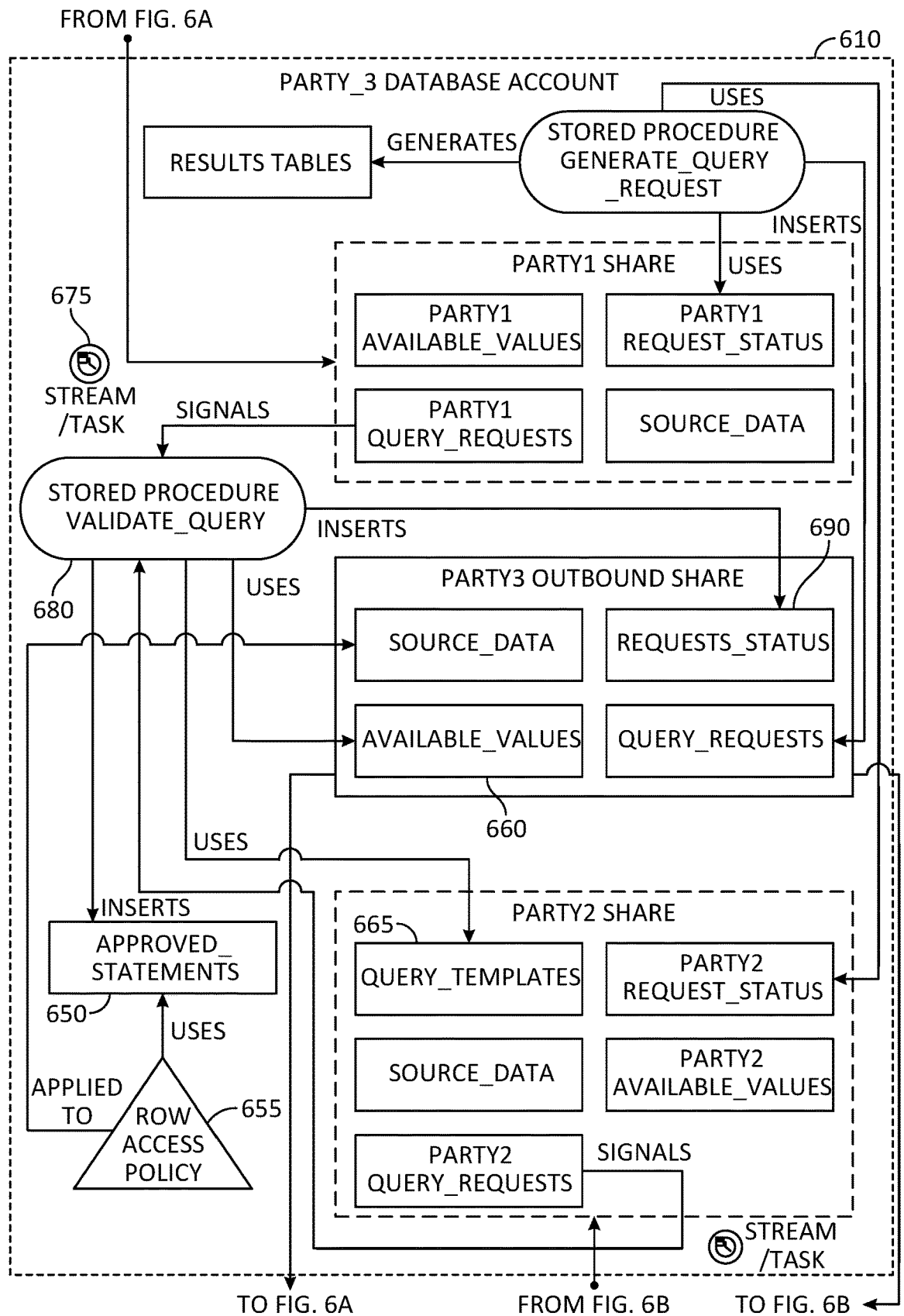

FIG. 6A-6C shows an example data clean room architecture for sharing data between multiple parties, according to some example embodiments. In the illustrated example, party_1 database account 600 is in FIG. 6A, party_2 database account 605 is in FIG. 6B, and party_3 database account 610 is in FIG. 6C, where data is transferred (e.g., replicated, shared) between the different accounts, as indicated by the broken labeled arrows that refer to other figures; for example, in FIG. 6B, a "Party2 Outbound Share" is shared from the party_2 database account 605 to the party_1 database account 600 in which the share is labeled as "Party2 Share" and connected by a broken arrow between FIG. 6A and FIG. 6B. The below data flows refer to operations that each party performs to share data with the other parties of FIGS. 6A-6C. For example, at operation 650, the party_1 database account 600 creates its APPROVED_STATEMENTS in its own database instance (e.g., illustrated in FIG. 6A); likewise at operation 650, party_2 database account 605 creates its APPROVED_STATEMENTS in its own database instance (e.g., illustrated in FIG. 6B), and further, party_3 database account 610 creates its APPROVED_STATEMENTS in its own database instance (e.g., illustrated in FIG. 6C).

At operation 650, each party creates an APPROVED_STATEMENTS table that will store the query request SQL statements that have been validated and approved. In some example embodiments, one of the parties creates the approved statements table, which is then stored by the other parties. In some example embodiments, each of the parties creates their own approved statements table, and a given query on the shared data must satisfy each of the approved statements table or otherwise the query cannot proceed (e.g., "SELECT *" must be in each respective party's approved statements table in order for a query that contains "SELECT *" to operate on data shared between the parties of the cleanroom).

At operation 655, each party creates a row access policy that will be applied to the source table(s) shared to each other party for clean room request processing. The row access policy will check the current statement( ) function against values stored in the APPROVED_STATEMENTS table.

At operation 660, each party will generate their AVAILABLE_VALUES table, which acts as a data dictionary for other parties to understand which columns and values they can use in query requests. In some example embodiments, the available values comprises schema, allowed columns, and metadata specifying prohibited rows or cell values. In some example embodiments, the available values data is not the actual data itself (e.g., source data) but rather specifies what data can be accessed (e.g., which columns of the source data) by the other parties (e.g., consumer accounts) for use in their respective shared data jobs (e.g., overlap analysis).

With reference back to FIG. 6C, at operation 665, each party agrees on one or more query templates that can be used for query requests. For example, if a media publisher and advertiser are working together in a clean room, they may approve an "audience overlap" query template. The query template would store join information and other static logic, while using placeholders for the variables (select fields, filters, etc.).

As an additional example, one of the parties is a Provider Account that specifies which statements are stored in the Available Statements table (e.g., thereby dictating how the provider's data will be accessed by any consumer account wanting to access the Provider data). Further, in some example embodiments, the Provider Account further provides one or more query templates for use by any of the parties (e.g., consumer accounts) seeking to access the Provider's data according to the query template. For example, a query template can comprise blanks or placeholders " " that can be replaced by specific fields via the consumer request (e.g., the specific fields can be columns from the consumer data or columns from the provider data). Any change to the query template (e.g., adding an asterisk "*" to select all records) will be rejected by the data restrictions on the provider's data (e.g., the Row Access Policies (RAP) functions as a firewall for the provider's data).

Continuing, at operation 670 (FIG. 6A), one of the parties (e.g., party_1 database account 600, in this example) will generate a clean room query request by calling the GENERATE_QUERY_REQUEST stored procedure. This procedure will insert the new request into the QUERY_REQUESTS table. This table is shared to each other party, along with the source data table(s) that have the row access policy enabled, the party's AVAILABLE_VALUES table, and the REQUEST_STATUS table.

At operation 675, each party has a stream object created against the other party's QUERY_REQUESTS table, capturing any inserts to that table. A task object will run on a set schedule and execute the VALIDATE_QUERY stored procedure if the stream object has data At operation 680, the VALIDATE_QUERY procedure is configured to: (1) Ensure the query request select and filter columns are valid attributes by comparing against the AVAILABLE_VALUES table. (2) Ensure the query template accepts the variables submitted. (3) Ensure the threshold or other query restrictions are applied. (4) Generate a create table as select (CTAS) statement and store it in the APPROVED_STATEMENTS table if validation succeeds. (5) Update the REQUEST_STATUS table with success or failure. If successful, the create table as select (CTAS) statement is also added to the record.

At operation 685, the GENERATE_QUERY_REQUEST procedure will also call the VALIDATE_QUERY procedure on the requesting party's account. This is to ensure the query generated by each additional party and the requesting party matches, as an extra layer of validation.

At operation 690, the REQUEST_STATUS table, which is shared by each party, is updated with the status from the VALIDATE_QUERY procedure. The GENERATE_QUERY_REQUEST procedure will wait and poll each REQUEST_STATUS table until a status is returned.

At operation 699, once each party has returned a status, the GENERATE_QUERY_REQUEST procedure will compare all of the CTAS statements to ensure they match (if status is approved). If they all match, the procedure will execute the statement and generate the results table.

Figure 7A:
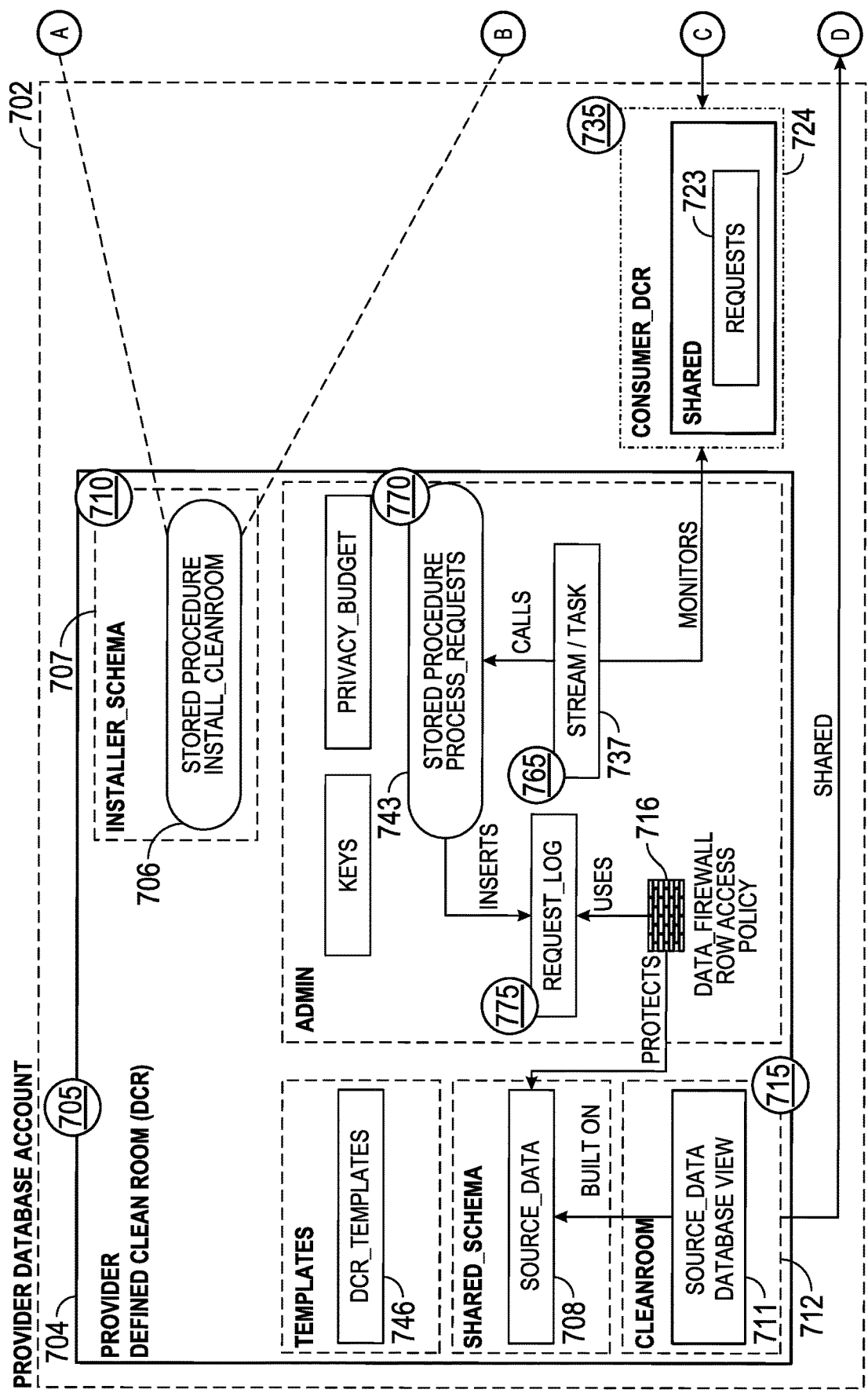
FIGS. 7A and 7B show example database architectures for implementing a defined access clean room, according to some example embodiments.
Figure 7B:
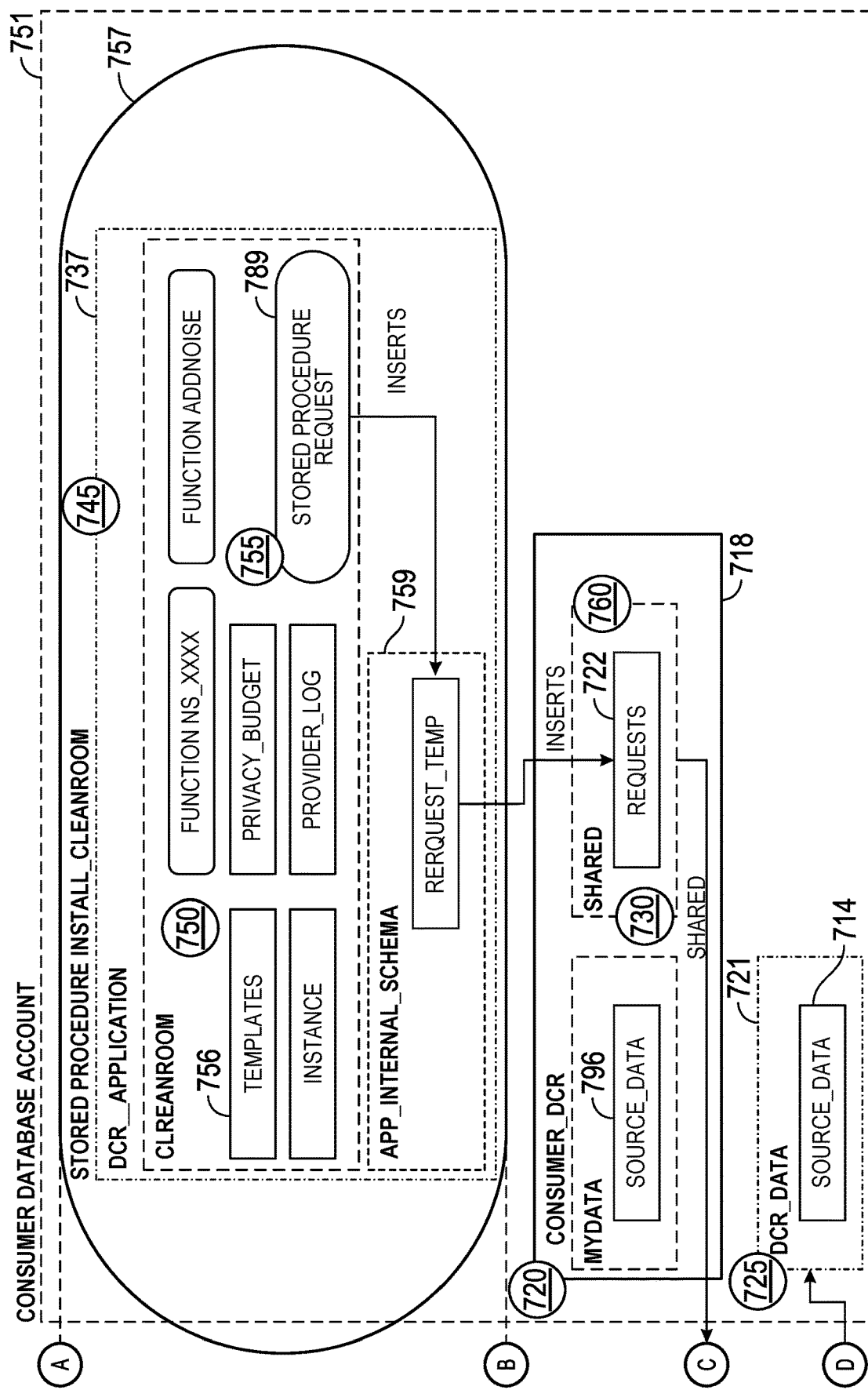

FIGS. 7A and 7B show example data architectures for implementing defined access clean rooms using native applications, in accordance with some example embodiments. In some example embodiments, a native application is configured so that a provider can create local state objects (e.g., tables) and local compute objects (e.g., stored procedures, external functions, tasks) and also share objects representing the application logic in the consumer account. In some example embodiments, a native application is installed in the consumer accounts as a database instance that is shareable. For example, a provider can generate a native application that includes stored procedures and external functions that analyze and enrich data in a given consumer account. A consumer can install the provider's native application in the consumer's account as a database and call stored procedures in the installed native application that provide the application functionality. In some example embodiments, the native application is configured to write only to a database in the consumer account. Further, in some example embodiments, a native application of a provider can be packaged with one or more other objects such as tables, views, and stored procedures of the provider account, which are then generated in the consumer account upon installation via an installer script. In some example embodiments, the native application installer script is configured to: (1) create local objects in the consumer account, and (2) control the visibility of objects in native application with the different consumer accounts that may install the provider's native application.

FIG. 7A shows a provider database account 702 and FIG. 7B shows a consumer database account 751 where connections between FIGS. 7A and 7B are shown using capital letters with circles (e.g., A, B, C, and D). With reference to FIG. 7A, at operation 705, the provider database account 702 generates a defined access clean room 704 (DCR). At operation 710, the provider database account 702 shares an installer clean room stored procedure 706 as a native database application with the consumer database account 751. At operation 715 in FIG. 7A, the provider database account 702 shares source data 708 as a source data database view 711 in a clean room 712 which is then accessible by the consumer database account 751 as source data 714 (in FIG. 7B). While the source data 714 is accessible as a share by the consumer database account 751, the source data 714 may be empty (e.g., not yet populated) and is controlled by a data firewall 716, such as a row access policy of the provider database account 702, as discussed above. In FIG. 7B, at operation 720, the consumer database account 751 creates a clean room consumer database 718.

At operation 725, the consumer database account 751 creates the database store 721 to store the source data 714 shared from the provider database account 702. At operation 730, the consumer database account 751 shares a requests table 722 with the provider database account 702 as consumer-defined clean room shared requests table 723 (in FIG. 7A). At operation 735, the provider database account 702 creates a consumer store database 724 to store a requests table 723 received as a consumer share from the consumer database account 751. Further, the provider database account 702 creates a management object 737 comprising a stream object to track changes on the requests table 723, and a task object in the management object 737 to execute the process requests stored procedure 743 when a new request is input into the requests table 723 (e.g., a request from the consumer and user that is input into the requests table 722 and that is automatically shared as an entry in requests table 723). In FIG. 7B, at operation 745, the consumer database account 751 creates a database store 721 to store the provider's shared source data 714 (in FIG. 7B), which initiates a stored procedure installer script that generates a runtime instance of a native application 757. In FIG. 7B, at operation 750, the execution and creation of the data clean room native application 757 using the native application installer procedure 706 creates a clean room schema, and all of the objects within the clean room as specified in the native application installer procedure 706, in accordance with some example embodiments. Further, the native application installer procedure 706 grants privileges on the tables and the request data stored procedure. Further, the native application installer procedure 706 creates application internal schema 759 for use in request processing.

At operation 755, the consumer database account 751 generates a clean room request by calling the request stored procedure 789 and passes in a query template name (e.g., of a template from query templates 756, a template repository), selects groups by columns, filters, a privacy budget to implement, and any other parameters that are required for the query template chosen or otherwise passed in.

At operation 760, consumer database account 751 implements the request stored procedure 789 which is configured to (1) generate a query based on the query template and the parameters passed in, (2) signed the query request using an encryption key created by the data clean room native application 757 to authenticate to the provider database account 702 that the data clean room native application 757 issued the request, (3) apply differential privacy noise parameter to the query results based on an epsilon value (a.k.a. privacy budget) passed in with the query, and (4) when the query is input into the requests table 722 the query is automatically shared with the provider as an entry in the requests table 723.

At operation 765 in FIG. 7A, the provider database account 702 implemented stream to capture the insert entry into the requests table 723 subsequently triggers the task of the management object 737 to execute the process requests stored procedure 743. At operation 770, the process requests stored procedure 743 executes the query that validates the requests. In some example embodiments, the validation that is performed by the process requests stored procedure 743 comprises (1) determining that the encrypted request key matches the provider key, (2) confirming that the request originated from a corresponding preauthorized consumer account (e.g., consumer database account 751), (3) confirming that the query uses a valid template from the templates 746 (e.g., from a plurality of valid and preconfigured templates authorized by the provider), (4) confirming that the instant ID of data clean room native application 757 matches the expected instance ID, and (5) confirming that the provider database account 702 is the expected or preconfigured account. At operation 775, if the request is valid, the provider database account 702 updates the status as "approved" in a request log 776, which configures the data firewall 716 (e.g., row access policy) to provide access to one or more rows from the source data 708; where the RAP provided rows are then shared to the consumer database account 751 as source data 714. In FIG. 7B, once the data is shared into the source data 714, the consumer database account 751 can execute the query within the data clean room native application 757 on the consumer database account 751 (e.g., by execution nodes of the consumer database account 751).

Figure 8:
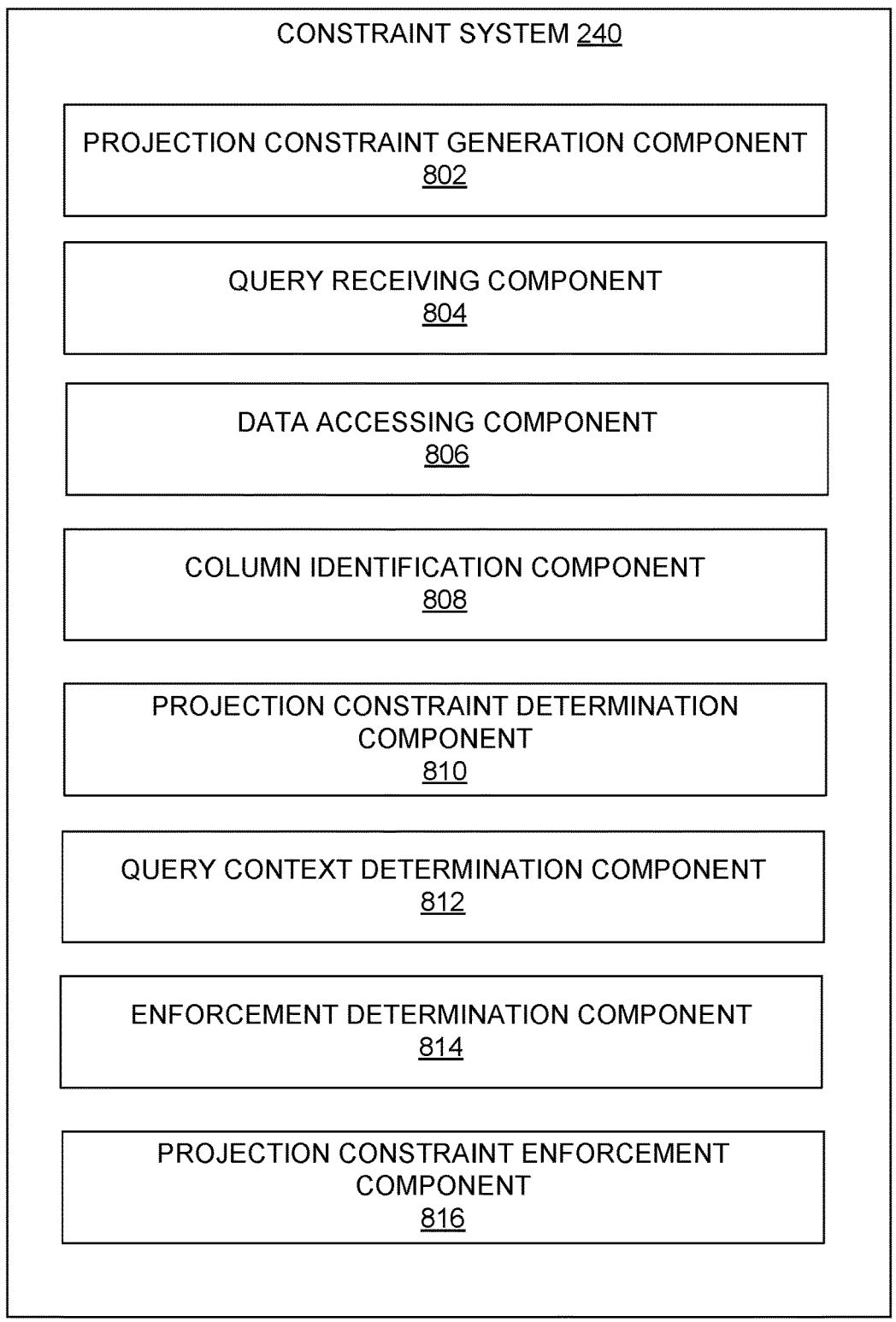
FIG. 8 is a block diagram illustrating components of a constraint system, according to some example embodiments.

FIG. 8 is a block diagram illustrating components of a constraint system 240, according to some example embodiments. As explained earlier, databases are used by various entities (e.g., businesses, people, organizations, etc.) to store data. For example, a retailer may store data describing purchases (e.g., product, date, price) and the purchasers (e.g., name, address, email address). Similarly, an advertiser may store data describing performance of their advertising campaigns, such as the advertisements served to users, date that advertisement was served, information about the user, (e.g., name, address, email address), and the like.

In some cases, entities may wish to share their data with each other. For example, a retailer and advertiser may wish to share their data to determine the effectiveness of an advertisement campaign, such as by determining whether users that were served advertisements for a product ultimately purchased the product. In these types of situations, the entities may wish to maintain the confidentiality of some or all of the data they have collected and stored in their respective databases. For example, a retailer and/or advertiser may wish to maintain the confidentiality of personal identifying information (PII), such as usernames, addresses, email addresses, credit card numbers, and the like. As another example, entities sharing data may wish to maintain the confidentiality of their proprietary data, such as their customer lists.

Current solutions address this problem through use of tokenization in which the data values stored in the respective databases are anonymized into tokens in a consistent and deterministic manner prior to being shared. For example, a hashing algorithm can be used by each entity to generate hash values (e.g., tokens) representing the individual data values stored in the databases. The entities share these tokens with each other, which can then be used to compare data and find matching values, while maintaining the confidentiality of the underlying data.

Tokenization, however, has several drawbacks. One drawback is that tokenization does not allow for fuzzy or proximate matches. In some cases, data may not be entered in a consistent format or correctly in various databases. As tokenization utilizes a deterministic algorithm to generate the tokens, only exact matches can be identified and these variations in format and data entries (e.g., fuzzy matches) cannot be accounted for. Another drawback with tokenization is the complexity and computational resources required to generate the tokens. For example, a hashing algorithm is used to generate hash values for a large number of data values stored in the respective databases. Another drawback with tokenization is limited functionality as the tokens can only be used to find exact matches between two datasets. Other functionality, such as determining a number of data entries that don't match but include a specified string or set of characters cannot be performed.

To alleviate these issues, the constraint system 240 enforces projection constraints on data values stored in specified columns of a shared dataset when queries are received by the network-based database system 102. A projection constraint identifies that the data in a column may be restricted from being projected (e.g., presented, read, outputted) in an output to a received query, while allowing specified operations to be performed on the data and a corresponding output to be provided. For example, the projection constraint may indicate a context for a query that triggers the constraint, such as based on the user/role, accounts and/or shares associated with the query.

An entity sharing data may define the projection constraints to be attached to various columns of a shared dataset. For example, the entity may define the column or columns that the projection constraint should be attached to, as well as the conditions for triggering the constraint. When a query directed towards the shared dataset is received by the network-based database system 102, the constraint system 240 accesses the data needed to process the query from the shared database and determines whether a projection constraint is attached to any of the columns of the shared dataset from which the data was accessed. If a projection constraint is attached to one of the columns, the constraint system 240 determines whether the projection constraint should be enforced based on the context of the query and generates an output accordingly. For example, if the projection constraint should be enforced, the constraint system 240 may generate an output that does not include the data values stored in the columns but may provide an output determined based on the constrained data, such as a number of matches, number of fuzzy matches, number of matches including a specified string, unconstrained data associated with the constrained data, and the like.

Enforcing projection constraints on queries received at the network-based database system 102 allows for data to be shared and used anonymously by entities to perform various operations without the need to tokenize the data. As a result, the difficulty and computing resources required for tokenization is eliminated, and additional functionality and operations (e.g., fuzzy matching) can be performed while maintaining the confidentiality of specified data values.

The constraint system 240 may be implemented within the network-based database system 102 when processing queries directed to shared datasets. For example, in some embodiments, the constraint system 240 may be implemented within a clean room provided by the data clean room system 230.

As shown, the constraint system 240 includes a projection constraint generation component 802, a query receiving component 804, a data accessing component 806, a column identification component 808, a projection constraint determination component 810, a query context determination component 812, an enforcement determination component 814, and a projection constraint enforcement component 816.

The projection constraint generation component 802 enables entities to establish projection constraints (e.g., projection constraint policies) to shared datasets. For example, the projection constraint generation component 802 may provide a user interface or other means of communication that allows entities to define projection constraints in relation to their data that is maintained and managed by the network-based database system 102. To define a projection constraint, the projection constraint generation component 802 enables users to provide data defining the shared datasets and columns to which a projection constraint should be attached. For example, a user may submit data defining a specific column and/or a group of columns within a shared dataset that should be attached with the projection constraint.

Further, the projection constraint generation component 802 enables users to define conditions for triggering the projection constraint. This may include defining the specific context and/or contexts that triggers enforcement of the projection constraint. For example, the projection constraint generation component 802 may enable users to define roles of users, accounts and/or shares, that would trigger the projection constraint and/or are enabled to project the constrained column of data.

After receiving data defining a projection constraint, the projection constraint generation component 802 generates a file that is attached to the identified columns. In some embodiments, the file may include a Boolean function based on the provided conditions for the projection constraint. For example, the Boolean function may provide an output of true if the projection constraint should be enforced in relation to a query and an output of false if the projection constraint should not be enforced in relation to a query. Attaching the file to the column establishes the projection constraint to the column of data for subsequent queries.

The query receiving component 804 receives a query directed to a shared dataset. The query may include data defining data to be accessed and one or more operations to perform on the data. The operations may include any type of operations used in relation to data maintained by the network-based database system 102, such as join operation, read operation, and the like. The query receiving component 804 may provide data associated with the query to the other components of the constraint system 240, such as the data accessing component 806 and the query context determination component 812.

The data accessing component 806 accesses a set of data based on a query received by the query receiving component

804. For example, the data accessing component may access data from columns and/or sub-columns of the shared dataset that are identified by the query and/or are needed to generate an output based on the received query. The data accessing component 806 may provide the accessed data to other components of the constraint system 240, such as the projection constraint enforcement component 816.

The column identification component 808 determines the columns associated with the data accessed by the data accessing component 806 in response to a query. This includes columns and/or sub-columns from which the data was accessed. The column identification component 808 may provide data identifying the columns to the other components of the constraint system 240, such as the projection constraint determination component 810.

The projection constraint determination component 810 determines whether a projection constraint (e.g., projection constraint policy) is attached to any of the columns identified by the column identification component 808. For example, the projection constraint determination component 810 determines whether a file defining a projection constraint is attached to any of the columns and/or sub-columns identified by the column identification component 810. The projection constraint determination component 810 may provide data indicating whether a projection constraint is attached to any of the columns and/or the file defining the projection constraints to the other components of the constraint system 240, such as the enforcement determination component 814.

The query context determination component 812 determines a context associated with a received query. For example, the query context determination component 812 may use data associated with a received query to determine the context, such as by determining the role of the user that submitted the query, an account of the network-based database system 102 associated with the submitted query, a data share associated with the query, and the like. The query context determination component 812 may provide data defining the determined context of the query to the other components of the constraint system 240, such as the enforcement determination component 814.

The enforcement determination component 814 determines whether a projection constraint should be enforced in relation to a received query. For example, the enforcement determination component 814 uses the data received from the projection constraint determination component 810 indicating whether a projection constraint is attached to any of the columns and/or the file defining the projection constraints as well as the context of the query received from the query context determination component 812 to determine whether a projection constraint should be enforced.

If a query constraint is not attached to any of the columns, the enforcement determination component 814 determines that a projection constraint should not be enforced in relation to the query. Alternatively, if a projection constraint is attached to one of the columns, the enforcement determination component 814 uses the context of the query to determine whether the projection constraint should be enforced. For example, the enforcement determination component 814 may use the context of the query to determine whether the conditions defined in the file attached to the column are satisfied to trigger the projection constraint. In some embodiments, the enforcement determination component 814 may use the context of the query as an input into the Boolean function defined by the projection constraint to determine whether the projection constraint is triggered. For example, if the Boolean function returns a true value, the enforcement determination component 814 determines that the projection constraint should be enforced. Alternatively, if the Boolean function returns a false value, the enforcement determination component 814 determines that the projection constraint should not be enforced.

The enforcement determination component 814 may provide data indicating whether the projection constraint should be enforced to the other components of the constraint system 240, such as the projection constraint enforcement component 816.

The projection constraint enforcement component 816 enforces a projection constraint in relation to a query. For example, the projection constraint enforcement component 816 may prohibit an output to a query from including data values from any constrained columns of a shared dataset. This may include denying a query altogether based on the operations included in the query, such as if the query requests to simply output the values of a constrained column. However, the projection constraint enforcement component 816 may allow for many other operations to be performed while maintaining the confidentiality of the data values in the restricted columns, thereby allowing for additional functionality compared to current solutions (e.g., tokenization). For example, the projection constraint enforcement component 816 allows for operations that provide an output indicating a number of data values within a column that match a specified key value or values from another column, including fuzzy matches. As one example, two tables can be joined on a projection-constrained column using a case-insensitive or approximate match. Tokenization solutions are generally not suitable for these purposes.

The projection constraint enforcement component 816 may also allow users to filter and perform other operations on data values stored in projection-constrained columns. For example, if an email-address column is projection-constrained, an analyst end-user is prevented from enumerating all of the email addresses but can be allowed to count the number of rows for which the predicate "ENDSWITH (email, 'database_123')" is true.

The projection constraint enforcement component 816 may provide an output to the query to a requesting user's client device.

As explained earlier, in some example embodiments, the constraint system 240 is integrated into a database clean room, as discussed above with reference to FIGS. 4-7B. The database clean room enables two or more end-users of the network-based database system 102 to share and collaborate on their sensitive data, without directly revealing that data to other participants. As an example, and in accordance with some example embodiments, the constraint system 240 can implement projection constraints in a clean room to perform database end-user intersection operations (e.g., companies A and B would like to know which database end-users they have in common, without disclosing their full database end-user lists to each other).

As an example, and in accordance with some example embodiments, the constraint system 240 can implement projection constraints in a clean room to perform enrichment operations. For instance, a company can implement the constraint system 240 to provide enrichment analytics. For instance, (1) given a credit card number, provide demographic information about the owner of the card, or (2) IP geolocation: given an IP address, provide the geographical location most likely associated with that IP. Enrichment providers want to enable consumers to look up key attributes (e.g., IP or credit card number data) for values of interest, possibly using fuzzy matches, without allowing the consumers to download all available keys.

In some example embodiments, projection constraints are enforced by constraint system 240 when a query is submitted by a user and compiled. A SQL compiler of the constraint system 240 analyzes each individual column accessed based on the query to determine the lineage of that column, e.g., where the data came from. In some example embodiments, the constraint-based approach of constraint system 240 is integrated in a SQL based system as discussed, here, however it is appreciated that the constraint-based approaches of the constraint system 240 can be integrated with any different query language or query system, other than SQL, in a similar manner. In this way, a user submits a query, and the constraint system 240 determines the meaning of the query, considers any applicable projection constraints, and ensures that the query complies with applicable constraints. In some example embodiments, if the data is from a projection-constrained column, then the constraint system 240 checks whether the constraint should be enforced based on context, such as the role of the user performing the query. If the constraint is intended to be enforced, then the constraint system 240 prevents the column, or any values derived directly from that column, from being included in the query output. In some example embodiments, the constrained column is permitted to be used based on specific pre-configured conditions (e.g., in WHERE clauses for filter conditions, GROUP BY clauses for aggregation queries, etc.), and other contexts.

In some example embodiments, the constraint system 240 implements constraints using a native policy framework of the network-based database system 102 (e.g., dynamic data masking (column masking) and Row Access Policies). In some example embodiments, similar to a masking policy of the network-based database system 102, the constraint system 240 attaches a given projection constraint policy to one or more specific columns. In these example embodiments, the projection constraint policy body is evaluated to determine whether and how to limit access to that column when a given query is received from a consumer end-user.

Figure 9A:
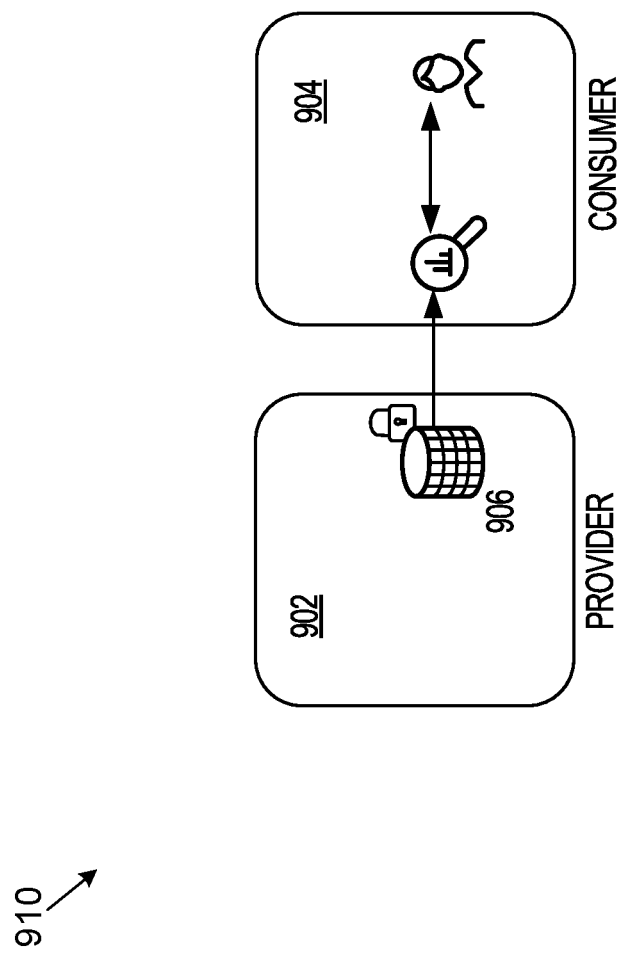
FIGS. 9A-9D illustrates various data sharing scenarios in which projection constraints may be implemented, according to some example embodiments.

FIGS. 9A-9D illustrates various data sharing scenarios in which projection constraints may be implemented, in accordance with some example embodiments. FIG. 9A illustrates a data sharing scenario 910 in which a provider 902 shares their data with one or more consumers 904. In this type of scenario, the shared data 906 (e.g., shared dataset) is associated with and managed by a single entity (e.g., provider 902) and shared with one or more other entities (e.g., consumers 904). The shared data 906 is therefore not a combination of data provided by multiple entities. In this type of scenario, the constraint system 240 may be implemented to enforce projection constraints on queries submitted by the one or more consumers 904. A provider 902 can implement projection constraints to protect any sensitive data by dictating which columns of data cannot be projected by the consumers 904. For example, the provider 902 may establish a projection constraint to prohibit each of the consumers 904 from projecting data in a protected column or set a projection constraint to vary whether the data can be projected based on the context of the query, such as which consumer 904 submitted a query.

Figure 9B:
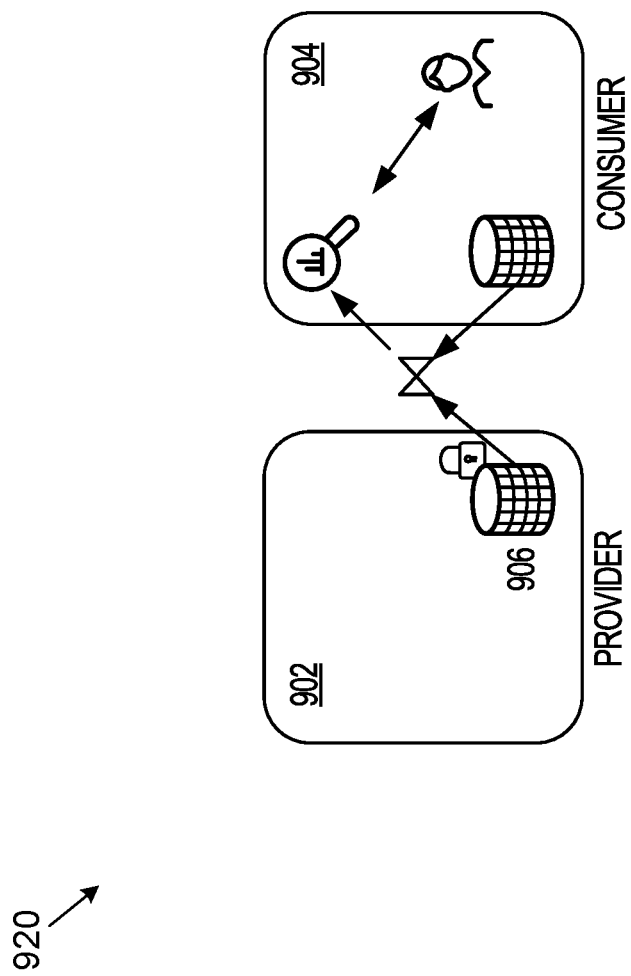

FIG. 9B illustrates a data sharing scenario 920 in which a provider 902 shares data with a consumer 904 and the shared data 906 is combined with the consumer's 904 data. In this type of scenario, the shared data 906 is associated with and managed by a single entity (e.g., provider 902) and shared with one or more other entities (e.g., consumers 904), which combine the shared data 906 with their own data. In this type of scenario, the constraint system 240 may be implemented to enforce projection constraints on queries submitted by the one or more consumers 904. A provider 902 can implement projection constraints to protect any sensitive data by dictating which columns of data cannot be projected by the consumers 904, while allowing the consumer 904 to perform operations on the shared data 906 based on the consumer's data. For example, the consumer 904 may perform operations to determine and output a number of matches between the consumer's data and data in the constrained columns of the shared data 906 but may be prohibited from projecting the data values of the constrained columns. As in the example, shown in FIG. 9A, the provider 902 may establish a projection constraint to prohibit each of the consumers 904 from projecting data in a protected column or set a projection constraint to vary whether the data can be projected based on the context of a query, such as which consumer 904 submitted a query.

Figure 9C:
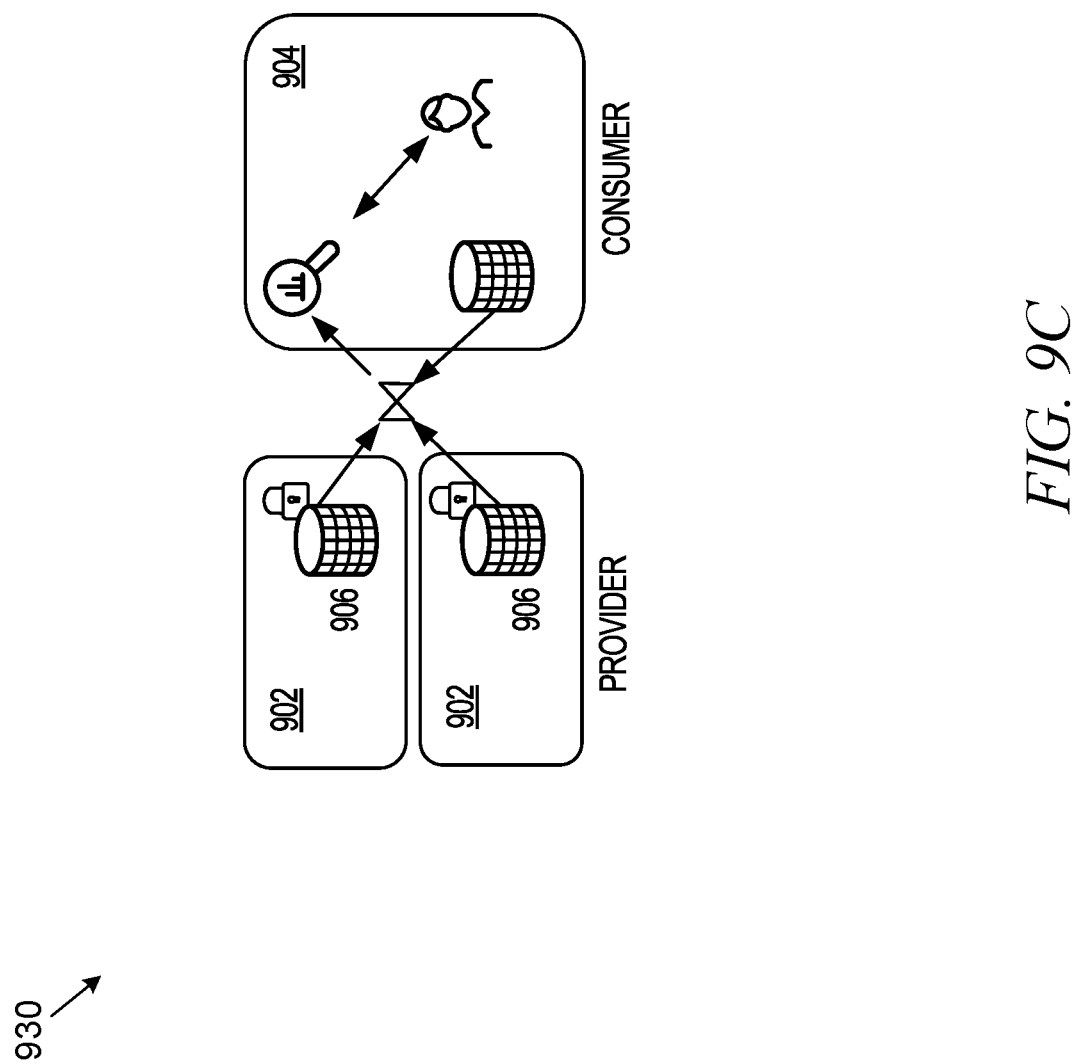

FIG. 9C illustrates a data sharing scenario 930 in which data shared by multiple providers 902 is combined and shared with a consumer 904. In this type of scenario, the shared data 906 is a combination of data associated with and managed by multiple entities (e.g., providers 902) and the shared data 906 is shared with one or more other entities (e.g., consumers 904). In this type of scenario, the constraint system 240 may be implemented to enforce projection constraints on queries submitted by the one or more consumers 904. Each of the providers 902 can implement projection constraints to protect any sensitive data shared by the respective provider 902 by dictating which columns of the data cannot be projected by the consumers 904. In this type of embodiment, a query submitted by a consumer 904 would be evaluated based on the query constraints provided by each provider 902.

The shared data 906 may be accessed by a consumer 904 without being combined with the consumer's data, as shown in FIG. 9A, or a consumer 904 may combine the shared data 906 with the consumer's own data, as shown in FIG. 9B. Each provider 902 may establish projection constraints to prohibit each of the consumers 904 from projecting data in a protected column or set a projection constraint to vary whether the data can be projected based on the context of a query, such as which consumer 904 submitted a query.

Figure 9D:
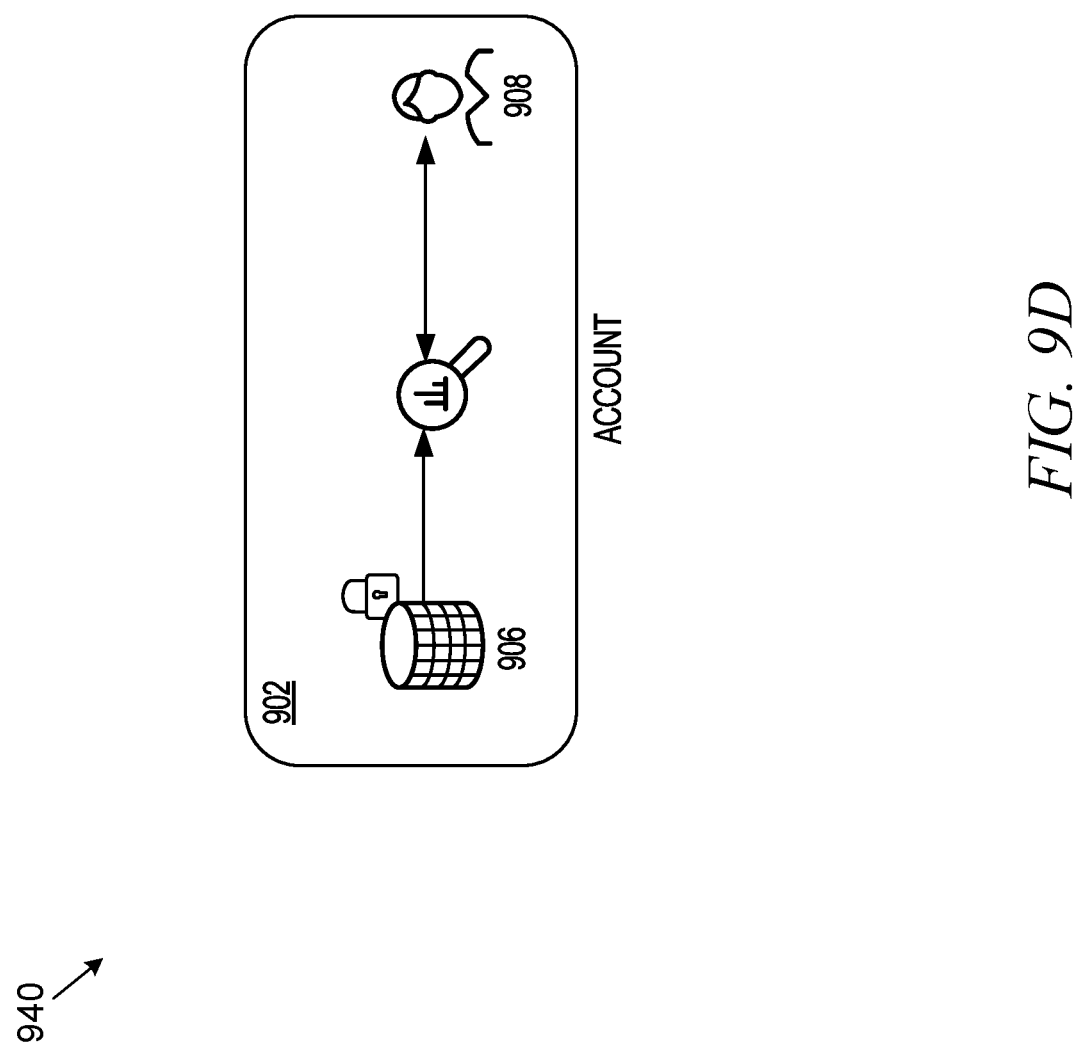

FIG. 9D illustrates a data sharing scenario 940 in which a provider 902 shares data with internal users 908. In this type of scenario, the shared data 906 is a data associated with and managed by a single entity (e.g., provider 902) and the shared data 906 is shared with one or more other users associated with the entity (e.g., internal users 908). In this type of scenario, the constraint system 240 may be implemented to enforce projection constraints on queries submitted by the one or more internal users. The provider 902 can implement projection constraints to protect any sensitive data shared by the provider 902 by dictating which columns of the data cannot be projected by the internal users 908. For example, the provider 902 may establish projection constraints to prohibit each of the internal users 908 from projecting data in a protected column or set a projection constraint to vary whether the data can be projected based on the context of a query, such as the role of the internal user 908 that submitted a query.

Figure 10:
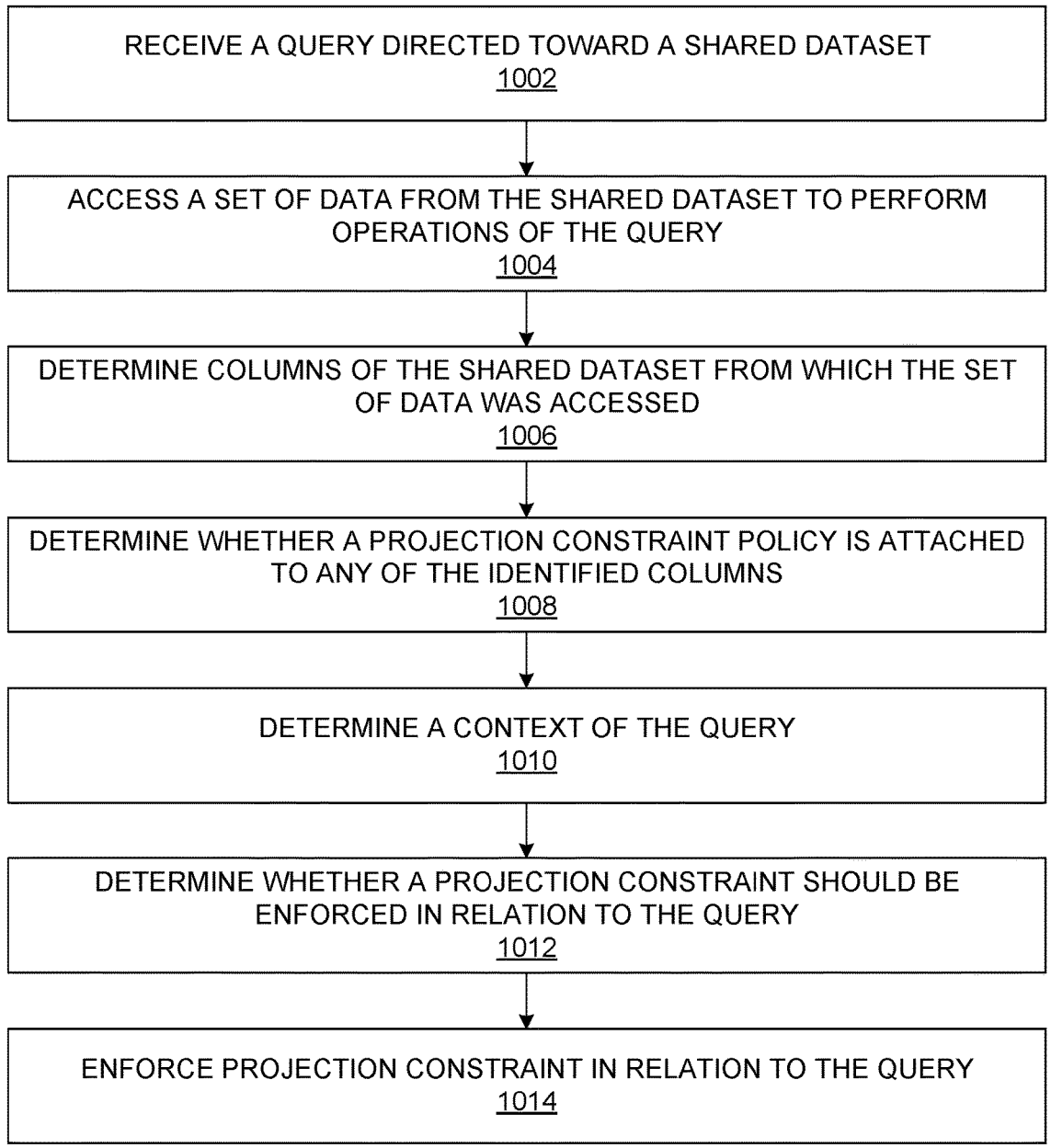
FIG. 10 shows a flow diagram of a method for implementing projection constraint-based access to a dataset on a distributed database, according to some example embodiments.

FIG. 10 shows a flow diagram of a method 1000 for implementing projection constraint-based access to a dataset on a distributed database, according to some example embodiments.

At operation 1002, the query receiving component 804 receives a query directed towards a shared dataset. The query may include data defining data to be accessed and one or more operations to perform on the data. The operations may include any type of operations used in relation to data maintained by the network-based database system 102, such as join operation, read operation, and the like. The query receiving component 804 may provide data associated with the query to the other components of the constraint system 240, such as the data accessing component 806 and the query context determination component 812.

At operation 1004, the data accessing component 806 accesses a set of data from the shared dataset to perform operations of the query. For example, the data accessing component may access data from columns and/or sub-columns of the shared dataset that are identified by the query and/or are needed to generate an output based on the received query. The data accessing component 806 may provide the accessed data to other components of the constraint system 240, such as the projection constraint enforcement component 816.

At operation 1006, the column identification component 808 determines columns of the shared dataset from which the set of data was accessed. This includes columns and/or sub-columns from which the data was accessed. The column identification component 808 may provide data identifying the columns to the other components of the constraint system 240, such as the projection constraint determination component 810.

At operation 1008, the projection constraint determination component 810 determines whether a projection constraint policy is attached to any of the identified columns. For example, the projection constraint determination component 810 determines whether a file defining a projection constraint is attached to any of the columns and/or sub-columns identified by the column identification component 810. The projection constraint determination component 810 may provide data indicating whether a projection constraint is attached to any of the columns and/or the file defining the projection constraints to the other components of the constraint system 240, such as the enforcement determination component 814.

At operation 1010, the query context determination component 812 determines a context of the query. For example, the query context determination component 812 may use data associated with a received query to determine the context, such as by determining the role of the user that submitted the query, an account of the network-based database system 102 associated with the submitted query, a data share associated with the query, and the like. The query context determination component 812 may provide data defining the determined context of the query to the other components of the constraint system 240, such as the enforcement determination component 814.

At operation 1012, the enforcement determination component 814 determines whether a projection constraint should be enforced in relation to a received query. For example, the enforcement determination component 814 uses the data received from the projection constraint determination component 810 indicating whether a projection constraint is attached to any of the columns and/or the file defining the projection constraints as well as the context of the query received from the query context determination component 812 to determine whether a projection constraint should be enforced.

If a query constraint is not attached to any of the columns, the enforcement determination component 814 determines that a projection constraint should not be enforced in relation to the query. Alternatively, if a projection constraint is attached to one of the columns, the enforcement determination component 814 uses the context of the query to determine whether the projection constraint should be enforced. For example, the enforcement determination component 814 may use the context of the query to determine whether the conditions defined in the file attached to the column are satisfied to trigger the projection constraint. In some embodiments, the enforcement determination component 814 may use the context of the query as an input into the Boolean function defined by the projection constraint to determine whether the projection constraint is triggered. For example, if the Boolean function returns a true value, the enforcement determination component 814 determines that the projection constraint should be enforced. Alternatively, if the Boolean function returns a false value, the enforcement determination component 814 determines that the projection constraint should not be enforced.

The enforcement determination component 814 may provide data indicating whether the projection constraint should be enforced to the other components of the constraint system 240, such as the projection constraint enforcement component 816.

At operation 1014, the projection constraint enforcement component 816 enforces a projection constraint in relation to a query. For example, the projection constraint enforcement component 816 may prohibit an output to a query from including data values from any constrained columns of a shared dataset. This may include denying a query altogether based on the operations included in the query, such as if the query requests to simply output the values of a constrained column. However, the projection constraint enforcement component 816 may allow for many other operations to be performed while maintaining the confidentiality of the data values in the restricted columns, thereby allowing for additional functionality compared to current solutions (e.g., tokenization). For example, the projection constraint enforcement component 816 allows for operations that provide an output indicating a number of data values within a column that match a specified key value or values from another column, including fuzzy matches. As one example, two tables can be joined on a projection-constrained column using a case-insensitive or approximate match. Tokenization solutions are generally not suitable for these purposes.

The projection constraint enforcement component 816 may also allow users to filter and perform other operations on data values stored in projection-constrained columns. For example, if an email-address column is projection-constrained, an analyst end-user is prevented from enumerating all of the email addresses but can be allowed to count the number of rows for which the predicate "ENDSWITH (email, 'database_123')" is true.

The projection constraint enforcement component 816 may provide an output to the query to a requesting user's client device.

Described implementations of the subject matter can include one or more features, alone or in combination as illustrated below by way of example.

Example 1 is a method comprising: receiving a first query directed towards a shared dataset, the first query identifying a first operation; accessing a first set of data from the shared dataset to perform the first operation, the first set of data including data accessed from a first column of the shared dataset; determining, by at least one hardware processor, that a projection constraint policy is attached to the first column, the projection constraint policy restricting output of data values stored in the first column; determining, based on a context of the first query, that the projection constraint policy should be enforced in relation to the first query; and generating an output to the first query based on the first set of data and the first operation, the output to the first query not including data values stored in the first column based on determining that the projection constraint policy should be enforced in relation to the first query.

In Example 2, the subject matter of Example 1 includes, wherein the context of the first query is based at least one of: a role of a user that submitted the first query, an account associated with the first query, and data shares associated with the first query.

In Example 3, the subject matter of any one of Examples 1-2 further comprises receiving a second query directed towards the shared dataset, the second query identifying a second operation; accessing a second set of data from the shared dataset to perform the second operation, the second set of data including data accessed from the first column of the shared dataset; determining that the projection constraint policy is attached to the first column; determining, based on a context of the second query, that the projection constraint policy should not be enforced in relation to the second query; and generating an output to the second query based on the second set of data and the second operation, the output to the second query including data values stored in the first column based on determining that the projection constraint policy should not be enforced in relation to the second query.

In Example 4, the subject matter of any of Examples 1-3 includes, wherein the shared dataset includes a first dataset associated with a first entity and a second dataset associated with a second entity, the first entity being associated with a first account of a database management system that receives the first query, the query having been received from a computing system associated with the second entity.

In Example 5, the subject matter of any of Examples 1-4 includes, wherein the second entity is associated with a second account of the database management system, the first account being different from the second account.

In Example 6, the subject matter of any of Examples 1-5 further comprises: receiving, from a computing system associated with the first entity, data defining the first projection constraint policy.

In Example 7, the subject matter of any of Examples 1-6 further comprises: receiving, from a computing system associated with the second entity, data defining a second projection constraint policy.

In Example 8, the subject matter of any of Examples 1-6 further comprises: receiving a second query directed towards the shared dataset, the second query identifying a second operation; accessing a second set of data from the shared dataset to perform the second operation, the second set of data including data accessed from a second column of the shared dataset, the second column being different from the first column; determining that a projection constraint policy is attached with the second column, the projection constraint policy associated with the second column restricting output of data values stored in the second column; determining, based on a context of the second query, whether the projection constraint policy associated with the second column should be enforced in relation to the second query; and generating an output to the second query based on the second set of data and the second operation, and the determining whether the projection constraint policy associated with the second column should be enforced in relation to the second query.

In Example 9, the subject matter of any of Examples 1-8 includes, wherein the first operation comprises a join operation.

In Example 10, the subject matter of any of Examples 1-9 includes, wherein the first data output indicates a number of matching values in the first column and a second column of the shared dataset.

Example 11 is a system comprising: one or more computer processors; and one or more computer-readable mediums storing instructions that, when executed by the one or more computer processors, cause the system to perform operations comprising: receiving a first query directed towards a shared dataset, the first query identifying a first operation; accessing a first set of data from the shared dataset to perform the first operation, the first set of data including data accessed from a first column of the shared dataset; determining that a projection constraint policy is attached to the first column, the projection constraint policy restricting output of data values stored in the first column; determining, based on a context of the first query, that the projection constraint policy should be enforced in relation to the first query; and generating an output to the first query based on the first set of data and the first operation, the output to the first query not including data values stored in the first column based on determining that the projection constraint policy should be enforced in relation to the first query.

In Example 12, the subject matter of Example 11 includes, wherein the context of the first query is based at least one of: a role of a user that submitted the first query, an account associated with the first query, and data shares associated with the first query.

In Example 13, the subject matter of any of Examples 11-12 includes, the operations further comprising: receiving a second query directed towards the shared dataset, the second query identifying a second operation; accessing a second set of data from the shared dataset to perform the second operation, the second set of data including data accessed from the first column of the shared dataset; determining that the projection constraint policy is attached to the first column; determining, based on a context of the second query, that the projection constraint policy should not be enforced in relation to the second query; and generating an output to the second query based on the second set of data and the second operation, the output to the second query including data values stored in the first column based on determining that the projection constraint policy should not be enforced in relation to the second query.

In Example 14, the subject matter of any of Examples 11-13 includes, wherein the shared dataset includes a first dataset associated with a first entity and a second dataset associated with a second entity, the first entity being associated with a first account of a database management system that receives the first query, the query having been received from a computing system associated with the second entity.

In Example 15, the subject matter of any of Examples 11-14 includes, wherein the second entity is associated with a second account of the database management system, the first account being different from the second account.

In Example 16, the subject matter of any of Examples 11-15 includes, the operations further comprising: receiving, from a computing system associated with the first entity, data defining the first projection constraint policy.

In Example 17, the subject matter of any of Examples 11-16 includes, the operations further comprising: receiving, from a computing system associated with the second entity, data defining a second projection constraint policy.

In Example 18, the subject matter of any of Examples 11-18 includes, the operations further comprising: receiving a second query directed towards the shared dataset, the second query identifying a second operation; accessing a second set of data from the shared dataset to perform the second operation, the second set of data including data accessed from a second column of the shared dataset, the second column being different from the first column; determining that a projection constraint policy is attached with the second column, the projection constraint policy associated with the second column restricting output of data values stored in the second column; determining, based on a context of the second query, whether the projection constraint policy associated with the second column should be enforced in relation to the second query; and generating an output to the second query based on the second set of data and the second operation, and the determining whether the projection constraint policy associated with the second column should be enforced in relation to the second query.

In Example 19, the subject matter of any of Examples 11-18 includes, wherein the first operation comprising a join operation.

In Example 20, the subject matter of any of Examples 11-19 includes, wherein the first data output indicates a number of matching values in the first column and a second column of the shared dataset.

Example 21 is a non-transitory computer-readable medium storing instructions that, when executed by one or more computer processors of one or more computing devices, cause the one or more computing devices to perform operations comprising: receiving a first query directed towards a shared dataset, the first query identifying a first operation; accessing a first set of data from the shared dataset to perform the first operation, the first set of data including data accessed from a first column of the shared dataset; determining that a projection constraint policy is attached to the first column, the projection constraint policy restricting output of data values stored in the first column; determining, based on a context of the first query, that the projection constraint policy should be enforced in relation to the first query; and generating an output to the first query based on the first set of data and the first operation, the output to the first query not including data values stored in the first column based on determining that the projection constraint policy should be enforced in relation to the first query.

In Example 22, the subject matter of Example 21 includes, wherein the context of the first query is based at least one of: a role of a user that submitted the first query, an account associated with the first query, and data shares associated with the first query.

In Example 23, the subject matter of any of Examples 21-22 includes, the operations further comprising: receiving a second query directed towards the shared dataset, the second query identifying a second operation; accessing a second set of data from the shared dataset to perform the second operation, the second set of data including data accessed from the first column of the shared dataset; determining that the projection constraint policy is attached to the first column; determining, based on a context of the second query, that the projection constraint policy should not be enforced in relation to the second query; and generating an output to the second query based on the second set of data and the second operation, the output to the second query including data values stored in the first column based on determining that the projection constraint policy should not be enforced in relation to the second query.

In Example 24, the subject matter of any of Examples 21-23 includes, wherein the shared dataset includes a first dataset associated with a first entity and a second dataset associated with a second entity, the first entity being associated with a first account of a database management system that receives the first query, the query having been received from a computing system associated with the second entity.

In Example 25, the subject matter of any of Examples 21-24 includes, wherein the second entity is associated with a second account of the database management system, the first account being different from the second account.

In Example 26, the subject matter of any of Examples 21-25 includes, the operations further comprising: receiving, from a computing system associated with the first entity, data defining the first projection constraint policy.

In Example 27, the subject matter of any of Examples 21-26 includes, the operations further comprising: receiving, from a computing system associated with the second entity, data defining a second projection constraint policy.

In Example 28, the subject matter of any of Examples 21-27 includes, the operations further comprising: receiving a second query directed towards the shared dataset, the second query identifying a second operation; accessing a second set of data from the shared dataset to perform the second operation, the second set of data including data accessed from a second column of the shared dataset, the second column being different from the first column; determining that a projection constraint policy is attached with the second column, the projection constraint policy associated with the second column restricting output of data values stored in the second column; determining, based on a context of the second query, whether the projection constraint policy associated with the second column should be enforced in relation to the second query; and generating an output to the second query based on the second set of data and the second operation, and the determining whether the projection constraint policy associated with the second column should be enforced in relation to the second query.

In Example 29, the subject matter of any of Examples 21-28 includes, wherein the first operation comprising a join operation.

In Example 30, the subject matter of any of Examples 21-29 includes, wherein the first data output indicates a number of matching values in the first column and a second column of the shared dataset.

Figure 11:
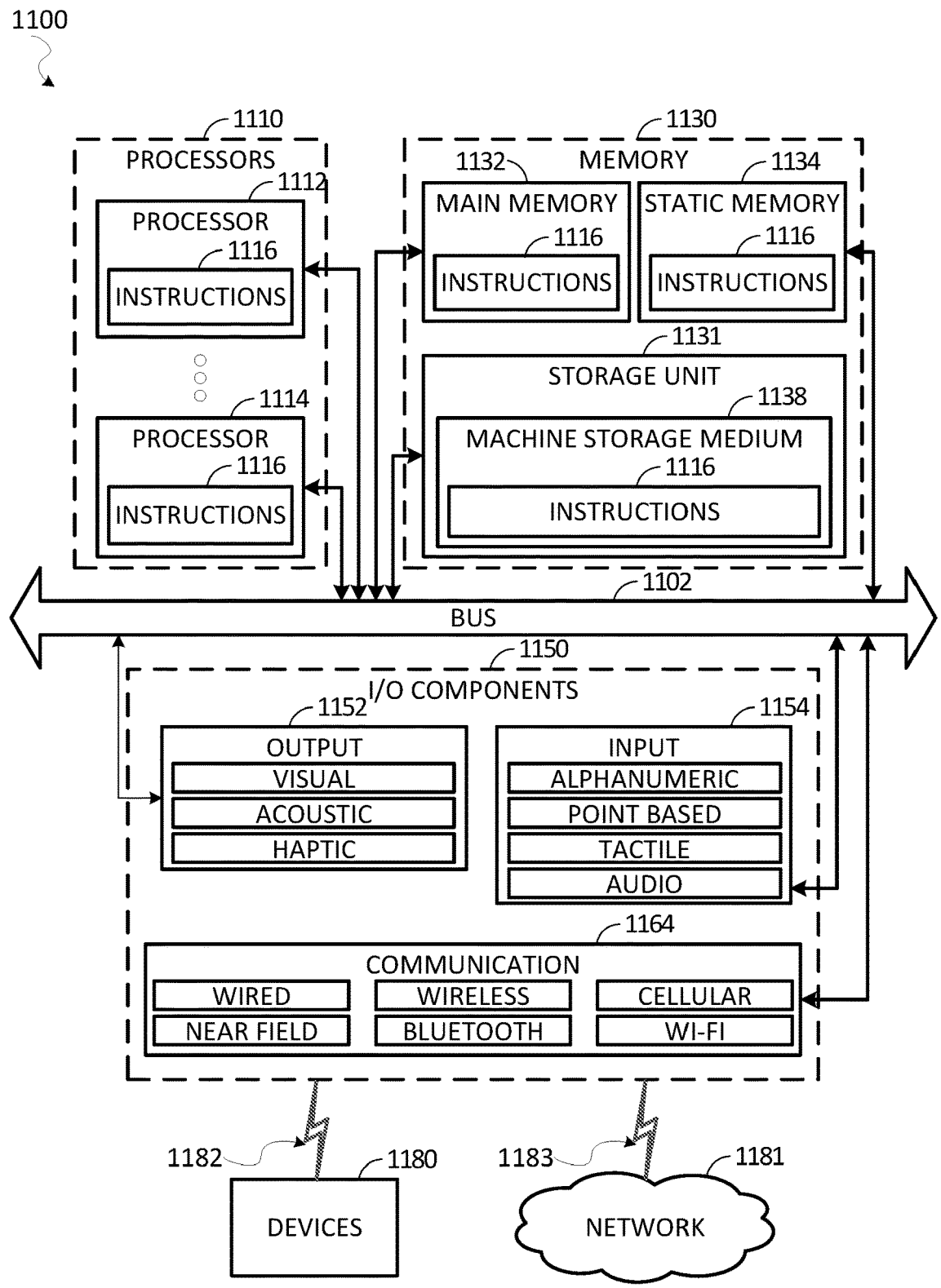
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code), for causing the machine 1100 to perform any one or more of the methodologies discussed herein, may be executed. For example, the instructions 1116 may cause the machine 1100 to execute any one or more operations of the method in FIG. 10, by one or more processors described herein. As another example, the instructions 1116 may cause the machine 1100 to implement portions of the data flows described herein. In this way, the instructions 1116 transform a general, non-programmed machine into a particular machine 1100 (e.g., the client device 114 of FIG. 1, the compute service manager 108 of FIG. 1, the execution platform 110 of FIG. 1) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1131, all accessible to the processors 1110 such as via the bus 1102. The main memory 1132, the static memory 1134, and the storage unit 1131 comprise a machine storage medium 1138 that may store the instructions 1116 embodying any one or more of the methodologies or functions described herein. The instructions 1116 may also reside, completely or partially, within the main memory 1132, within the static memory 1134, within the storage unit 1131, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines, such as mobile phones, will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1181 via a coupler 1183 or to devices 1180 via a coupling 1182. For example, the communication components 1164 may include a network interface component or another suitable device to interface with the network 1181. In further examples, the communication components 1164 may include wired communication components, wireless communication components, cellular communication components, and other communication components to provide communication via other modalities. The devices 1180 may be another machine or any of a wide variety of peripheral devices (e.g., a peripheral device coupled via a universal serial bus (USB)). For example, as noted above, the machine 1100 may correspond to any one of the client device 114, the compute service manager 108, and the execution platform 110, and may include any other of these systems and devices.

The various memories (e.g., 1130, 1132, 1134, and/or memory of the processor(s) 1110 and/or the storage unit 1131) may store one or more sets of instructions 1116 and data structures (e.g., software), embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1181 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1181 or a portion of the network 1181 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1181 using a transmission medium via a network interface device (e.g., a network interface component included in the communication components 1164), and utilizing any one of a number of well-known transfer protocols (e.g., hypertext transfer protocol (HTTP)). Similarly, the instructions 1116 may be transmitted or received using a transmission medium via the coupling 1182 (e.g., a peer-to-peer coupling) to the devices 1180. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to machieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   receiving, from a consumer account, a first query directed towards a shared dataset of a provider account, the first query identifying a first operation and including available values specifying data that is accessible to the consumer account by query requests;

accessing a first set of data from the shared dataset to perform the first operation, the first set of data including data accessed from a first column of the shared dataset;

determining, by at least one hardware processor, that the provider account attached a projection constraint policy to the first column, the projection constraint policy restricting output of data values, to the consumer account, stored in the first column;

determining, based on a context of the first query, that the projection constraint policy should be enforced in relation to the first query;

enforcing the projection constraint policy in relation to the first query, the enforcing comprising enabling the consumer account to perform the first operation on the data values stored in the first column while maintaining confidentiality of the data values; and generating an output to the first query based on the first set of data and the first operation, the output to the first query maintaining the confidentiality of the data values by not including the data values stored in the first column based on enforcing the projection constraint policy in relation to the first query.

2. The method of claim 1, wherein the context of the first query is based at least one of: a role of a user that submitted the first query, an account associated with the first query, and data shares associated with the first query.

3. The method of claim 1, further comprising:

receiving a second query directed towards the shared dataset, the second query identifying a second operation;

accessing a second set of data from the shared dataset to perform the second operation, the second set of data including the data accessed from the first column of the shared dataset;

determining that the projection constraint policy is attached to the first column;

determining, based on a context of the second query, that the projection constraint policy should not be enforced in relation to the second query; and generating an output to the second query based on the second set of data and the second operation, the output to the second query including the data values stored in the first column based on determining that the projection constraint policy should not be enforced in relation to the second query.

4. The method of claim 1, wherein the shared dataset includes a first dataset associated with a first entity and a second dataset associated with a second entity, the first entity being associated with the provider account of a database management system that receives the first query, the first query having been received from a computing system associated with the second entity.

5. The method of claim 4, wherein the second entity is associated with the consumer account of the database management system, the first entity being different from the second entity.

6. The method of claim 4, further comprising:

receiving, from the computing system associated with the first entity, data defining a first projection constraint policy.

7. The method of claim 6, further comprising:

receiving, from the computing system associated with the second entity, data defining a second projection constraint policy.

8. The method of claim 1, further comprising:

generating a defined access clean room in the provider account, the provider account being associated with a provider entity;

installing, in the consumer account, an application instance that implements the defined access clean room, the consumer account being associated with a consumer entity; and sharing, by the provider account, source provider data with the defined access clean room, the sharing making the source provider data accessible to the consumer account via the application instance.

9. The method of claim 1, wherein the first operation comprises a join operation.

10. The method of claim 1, wherein the output to the first query indicates a number of matching values in the first column and a second column of the shared dataset.

11. A system comprising:

one or more hardware processors of a machine; and at least one memory storing instructions that, when executed by the one or more hardware processors, cause the system to perform operations comprising:

receiving, from a consumer account, a first query directed towards a shared dataset associated with a provider account, the first query identifying a first operation and including available values specifying data that is accessible by the consumer account by query requests;

accessing a first set of data from the shared dataset to perform the first operation, the first set of data including data accessed from a first column of the shared dataset;

determining, by at least one hardware processor, that the provider account attached a projection constraint policy, by the provider account, to the first column, the projection constraint policy restricting output of data values, to the consumer account, stored in the first column;

determining, based on a context of the first query, that the projection constraint policy should be enforced in relation to the first query;

enforcing the projection constraint policy in relation to the first query, the enforcing comprising enabling the consumer account to perform the first operation on the data values stored in the first column while maintaining confidentiality of the data values; and generating an output to the first query based on the first set of data and the first operation, the output to the first query maintaining the confidentiality of the data values by not including the data values stored in the first column based on enforcing the projection constraint policy in relation to the first query.

12. The system of claim 11, wherein the context of the first query is based at least one of: a role of a user that submitted the first query, an account associated with the first query, and data shares associated with the first query.

13. The system of claim 11, the operations further comprising:

receiving a second query directed towards the shared dataset, the second query identifying a second operation;

accessing a second set of data from the shared dataset to perform the second operation, the second set of data including the data accessed from the first column of the shared dataset;

determining that the projection constraint policy is attached to the first column;

determining, based on a context of the second query, that the projection constraint policy should not be enforced in relation to the second query; and generating an output to the second query based on the second set of data and the second operation, the output to the second query including the data values stored in the first column based on determining that the projection constraint policy should not be enforced in relation to the second query.

14. The system of claim 11, wherein the shared dataset includes a first dataset associated with a first entity and a second dataset associated with a second entity, the first entity being associated with the provider account of a database management system that receives the first query, the first query having been received from a computing system associated with the second entity.

15. The system of claim 14, wherein the second entity is associated with the consumer account of the database management system, the first entity being different from the second entity.

16. The system of claim 14, the operations further comprising:
receiving, from the computing system associated with the first entity, data defining a first projection constraint policy.

17. The system of claim 16, the operations further comprising:
receiving, from the computing system associated with the second entity, data defining a second projection constraint policy.

18. The system of claim 11, the operations further comprising:
generating a defined access clean room in the provider account, the provider account being associated with a provider entity;
installing, in the consumer account, an application instance that implements the defined access clean room, the consumer account being associated with a consumer entity; and
sharing, by the provider account, source provider data with the defined access clean room, the sharing making the source provider data accessible to the consumer account via the application instance.

19. The system of claim 11, wherein the first operation comprising a join operation.

20. The system of claim 11, wherein the output to the first query indicates a number of matching values in the first column and a second column of the shared dataset.

21. A machine storage medium storing instructions that, when executed by one or more computer processors of one or more computing devices, cause the one or more computing devices to perform operations comprising:
receiving, from a consumer account, a first query directed towards a shared dataset associated with a provider account, the first query identifying a first operation and including available values specifying data that is accessible by the consumer account by query requests;
accessing a first set of data from the shared dataset to perform the first operation, the first set of data including data accessed from a first column of the shared dataset;
determining, by at least one hardware processor, that the provider account attached a projection constraint policy, by the provider account, to the first column, the projection constraint policy restricting output of data values, to the consumer account, stored in the first column;
determining, based on a context of the first query, that the projection constraint policy should be enforced in relation to the first query;
enforcing the projection constraint policy in relation to the first query, the enforcing comprising enabling the consumer account to perform the first operation on the data values stored in the first column while maintaining confidentiality of the data values; and
generating an output to the first query based on the first set of data and the first operation, the output to the first query maintaining the confidentiality of the data values by not including the data values stored in the first column based on enforcing the projection constraint policy in relation to the first query.

22. The machine storage medium of claim 21, wherein the context of the first query is based at least one of: a role of a user that submitted the first query, an account associated with the first query, and data shares associated with the first query.

23. The machine storage medium of claim 21, the operations further comprising:
receiving a second query directed towards the shared dataset, the second query identifying a second operation;
accessing a second set of data from the shared dataset to perform the second operation, the second set of data including the data accessed from the first column of the shared dataset;
determining that the projection constraint policy is attached to the first column;
determining, based on a context of the second query, that the projection constraint policy should not be enforced in relation to the second query; and
generating an output to the second query based on the second set of data and the second operation, the output to the second query including the data values stored in the first column based on determining that the projection constraint policy should not be enforced in relation to the second query.

24. The machine storage medium of claim 21, wherein the shared dataset includes a first dataset associated with a first entity and a second dataset associated with a second entity, the first entity being associated with the provider account of a database management system that receives the first query, the first query having been received from a computing system associated with the second entity.

25. The machine storage medium of claim 24, wherein the second entity is associated with the consumer account of the database management system, the first entity being different from the second entity.

26. The machine storage medium of claim 24, the operations further comprising:
receiving, from the computing system associated with the first entity, data defining a first projection constraint policy.

27. The machine storage medium of claim 26, the operations further comprising:
receiving, from the computing system associated with the second entity, data defining a second projection constraint policy.

28. The machine storage medium of claim 21, the operations further comprising:
generating a defined access clean room in the provider account, the provider account being associated with a provider entity;
installing, in the consumer account, an application instance that implements the defined access clean room, the consumer account being associated with a consumer entity; and sharing, by the provider account, source provider data with the defined access clean room, the sharing making the source provider data accessible to the consumer account via the application instance.

29. The machine storage medium of claim 21, wherein the first operation comprising a join operation.

30. The machine storage medium of claim 21, wherein the output to the first query indicates a number of matching values in the first column and a second column of the shared dataset.

\* \* \* \* \*

UNITED STATES PATENT AND TRADEMARK OFFICE
CERTIFICATE OF CORRECTION

PATENT NO. : 11,928,157 B2
APPLICATION NO. : 17/934814
DATED : March 12, 2024
INVENTOR(S) : Bijon et al.

Page 1 of 1

It is certified that error appears in the above-identified patent and that said Letters Patent is hereby corrected as shown below:

In the Claims

In Column 33, Line 25, in Claim 2, after "of:", insert a linebreak

In Column 34, Line 51, in Claim 12, after "of:", insert a linebreak

In Column 36, Line 13, in Claim 22, after "of:", insert a linebreak

Signed and Sealed this
Twenty-fourth Day of June, 2025

Coke Morgan Stewart
*Acting Director of the United States Patent and Trademark Office*